United States Patent
J et al.

(10) Patent No.: US 12,363,249 B2
(45) Date of Patent: Jul. 15, 2025

(54) METHOD AND SYSTEM FOR GENERATION OF A PLURALITY OF PORTRAIT EFFECTS IN AN ELECTRONIC DEVICE

(71) Applicant: Samsung Electronics Co., Ltd., Suwon-si (KR)

(72) Inventors: Mahesh P J, Bengaluru (IN); Pavan Sudheendra, Bengaluru (IN); Narasimha Gopalakrishna Pai, Bengaluru (IN); Prityush Chandra, Bengaluru (IN); Chevuru Sai Jaswanth, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 18/450,630

(22) Filed: Aug. 16, 2023

(65) Prior Publication Data

US 2024/0031512 A1    Jan. 25, 2024

Related U.S. Application Data

(63) Continuation of application No. PCT/KR2023/010118, filed on Jul. 14, 2023.

(30) Foreign Application Priority Data

Jul. 25, 2022  (IN) .............................. 202241042539
Jun. 5, 2023   (IN) .............................. 2022 41042539

(51) Int. Cl.
*H04N 5/05*   (2006.01)
*G06T 7/10*   (2017.01)
(Continued)

(52) U.S. Cl.
CPC ............. *H04N 5/2621* (2013.01); *G06T 7/10* (2017.01); *G06T 9/00* (2013.01); *H04N 23/959* (2023.01);
(Continued)

(58) Field of Classification Search
CPC ...... H04N 5/2621; H04N 23/959; G06T 7/10; G06T 9/00; G06T 2207/10024; G06T 2207/20084; G06T 5/60
See application file for complete search history.

(56) References Cited

U.S. PATENT DOCUMENTS 9,342,875 B2   5/2016  Lei et al.
11,087,513 B1  8/2021  Duan et al.
(Continued)

FOREIGN PATENT DOCUMENTS

CN   111524060 A   8/2020
CN   111861867 A   10/2020
(Continued)

OTHER PUBLICATIONS

International Search Report dated Oct. 24, 2023, issued in International Application No. PCT/KR2023/010118.
(Continued)

*Primary Examiner* — Hung H Lam
(74) *Attorney, Agent, or Firm* — Jefferson IP Law, LLP

(57) ABSTRACT

A method and a system for generation of a plurality of portrait effects in an electronic device are provided. The method includes feeding an image captured from the electronic device into an encoder pre-learned using a plurality of features corresponding to the plurality of portrait effects and extracting, using the encoder, at least one of one or more low level features and one or more high level features from the image. The method includes generating, for the image, one or more first portrait effects of the plurality of portrait effects by passing the image through one or more first decoders. The method includes generating, for the image, one or more second portrait effects of the plurality of portrait effects by passing the image through one or more second decoders, wherein each of the one or more first portrait effect, and the
(Continued)

one or more second portrait effects is generated in a single inference.

17 Claims, 22 Drawing Sheets

(51) Int. Cl.
*G06T 9/00* (2006.01)
*H04N 5/262* (2006.01)
*H04N 23/959* (2023.01)

(52) U.S. Cl.
CPC ............... *G06T 2207/10024* (2013.01); *G06T 2207/20084* (2013.01)

(56) References Cited

U.S. PATENT DOCUMENTS

| | | | |
|---|---|---|---|
| 11,636,580 B2* | 4/2023 | Tu | G06N 3/08 382/100 |
| 11,823,327 B2* | 11/2023 | Sevastopolskiy | G06T 15/506 |
| 2009/0040321 A1* | 2/2009 | Nakamura | H04N 5/272 348/222.1 |
| 2016/0093032 A1 | 3/2016 | Lei et al. | |
| 2020/0265565 A1 | 8/2020 | Hwang et al. | |
| 2021/0027100 A1* | 1/2021 | Bogdanovych | G06F 18/214 |
| 2021/0073953 A1 | 3/2021 | Lee | |
| 2021/0383509 A1 | 12/2021 | Demyanov et al. | |
| 2022/0036513 A1 | 2/2022 | Luo et al. | |
| 2022/0108454 A1 | 4/2022 | Tsai et al. | |
| 2022/0270215 A1 | 8/2022 | Lee | |
| 2023/0005160 A1* | 1/2023 | Yu | G06T 7/11 |
| 2023/0056657 A1* | 2/2023 | Abuolaim | G06T 9/004 |
| 2023/0222628 A1* | 7/2023 | Zhao | G06V 40/168 382/156 |
| 2024/0281978 A1* | 8/2024 | Liu | G06V 10/7715 |

FOREIGN PATENT DOCUMENTS

| | | |
|---|---|---|
| CN | 108010031 A | 12/2020 |
| CN | 112949651 A | 6/2021 |
| WO | 2021/045599 A1 | 3/2021 |
| WO | 2022/025565 A1 | 2/2022 |

OTHER PUBLICATIONS

Hariharan Nagasubramaniam et al., Bokeh Effect Rendering with Vision Transformers, TechRxiv, 2022.

Andrey Ignatov et al., Rendering Natural Camera Bokeh Effect with Deep Learning, 2020.

Saikat Dutta et al., Stacked Deep Multi-Scale Hierarchical Network for Fast Bokeh Effect Rendering from a Single Image, 2021.

Juewen Peng et al., BokehMe: When Neural Rendering Meets Classical Rendering, 2022.

Ming Qian et al., BGGAN: Bokeh-Glass Generative Adversarial Network for Rendering Realistic Bokeh, 2020.

Indian Office Action dated May 20, 2025, issued in Indian Application No. 202241042539.

* cited by examiner

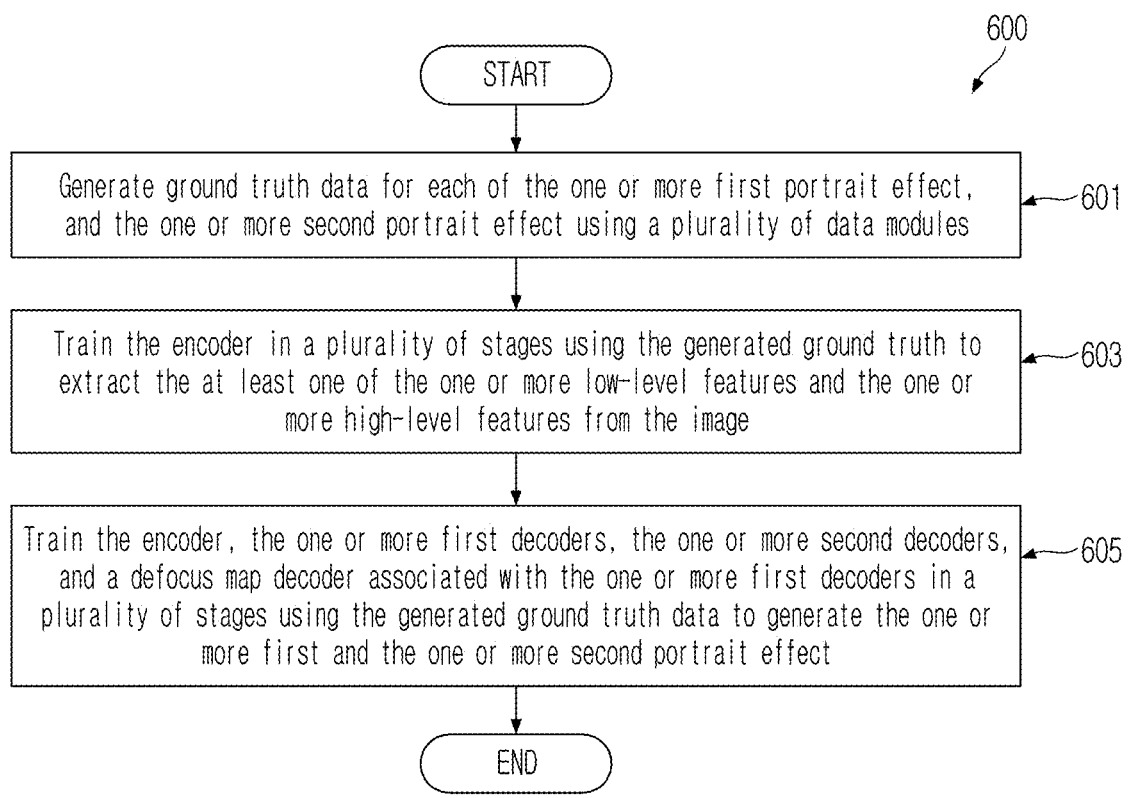

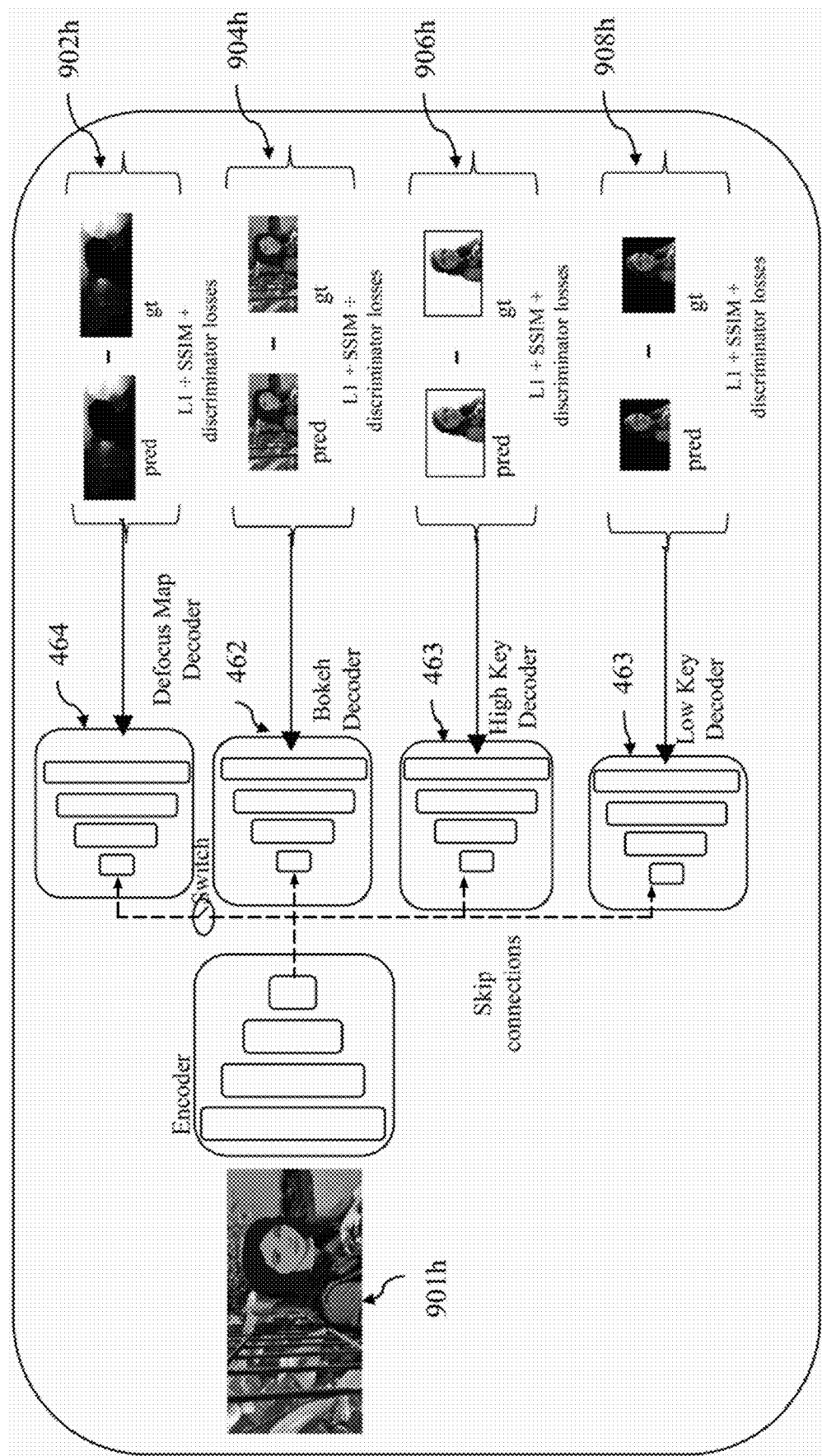

METHOD AND SYSTEM FOR GENERATION OF A PLURALITY OF PORTRAIT EFFECTS IN AN ELECTRONIC DEVICE

CROSS-REFERENCE TO RELATED APPLICATION(S)

This application is a continuation application, claiming priority under § 365(c), of an International application No. PCT/KR2023/010118, filed on Jul. 14, 2023, which is based on and claims the benefit of an Indian Provisional patent application number 202241042539, filed on Jul. 25, 2022, in the Indian Patent Office, and of an Indian Complete patent application number 202241042539, filed on Jun. 5, 2023, in the Indian Patent Office, the disclosure of each of which is incorporated by reference herein in its entirety.

BACKGROUND

1. Field

The disclosure relates to image processing. More particularly, the disclosure relates to a method and a system for generation of a plurality of portrait effects in an electronic device.

2. Description of Related Art

Portable electronic devices, such as smartphones and tablets may include one or more cameras to provide enhanced images (for example, still images and videos). A large portion of images/photographs taken using the electronic devices are portraits, such as "selfies" taken by users of the electronic devices themselves. Due to the intrinsic limitations enforced by the price and the real-estate of the electronic devices, there is a huge gap in terms of quality between images taken by a camera of non-professional electronic devices (e.g., mobile phones, smart watches, or the like) and those taken by professional devices, such as digital single-lens reflex (DSLR) cameras. FIG. 1 illustrates a plurality of portrait effects, according to the related art. DSLR cameras are particularly good at highlighting the main object of interest in the photograph using portrait effects, such as Bokeh, High Key, Low Key, or the like, referring to FIG. 1. Bokeh is an effect of creating a soft out-of-focus background, that can be achieved using a DSLR with a wide aperture lens. Further, high Key and low Key are studio lighting effects to highlight the main object of interest captured using the DSLR under a controlled studio lighting setup.

The portrait effects using electronic devices are currently being achieved computationally, as discussed hereinafter, which is time-consuming and results in a delay in generating the portrait effects. FIG. 2A illustrates a block diagram 200 of generating a Bokeh effect computationally, according to the related art. Referring to FIG. 2A, the computational Bokeh uses different modules, such as a single image depth estimation module 201, an instance segmentation module 203, an image matting module 205, a mask refinement module 207, and a blur rendering and blending module 209. However, each module of block diagram 200 has a great computational complexity which increases the processing time to process an image. Each of the single image depth estimation module 201, the instance segmentation module 203, and the image matting module 205 uses separate neural networks (NN) for processing the image which results in an increase in the computational complexity. FIG. 2B illustrates a comparison between the Bokeh effect generated by the computational method and a DSLR, according to the related art. Further, the quality of the Bokeh effect generated using the computational method 202 is poor as compared to the quality of the Bokeh effect 204 generated by the DSLR, as shown in FIG. 2B.

FIG. 3 illustrates a block diagram 300 of generating a studio lighting effect computationally, according to the related art. Referring to FIG. 3, the computational studio lighting effect, such as the High Key effect uses different modules, such as an instance segmentation module 301, an image matting module 303, a mask refinement module 305, a light effect generation module, and a blending module 307. However, each module of block diagram 300 has a great computational complexity which increases the processing time to process the image. Each of the instance segmentation module 301 and the image matting module 303 uses a separate NN for processing the image which results in an increase in the computational complexity. Further, the quality of the High Key effect generated using the computational method is poor as compared to the quality of the High Key effect generated by the DSLR. Hence, the computational methods of the related art are time-consuming while providing poor-quality effects.

Some solutions of the related art for achieving portrait effects include generating the effects by blurring a background region of the image according to a depth of field information of the image. Other solutions of the related art include using the depth of field information of an image, a confidence map, a disparity map and reference images to generate the portrait effects.

However, none of the methods of the related art reduces the complexity of processing the image and further fails to reduce the processing time. Also, the methods of the related art result in a delay (for instance, greater than 1.5 s) in switching across effects, i.e., Bokeh, High Key, and Low Key effects, due to the computational approach being separate for each portrait effect.

Thus, it is desired to address the above-mentioned disadvantages or other shortcomings or at least provide a useful alternative for the generation of portrait effects in non-DSLR electronic devices.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a system for generation of a plurality of portrait effects in an electronic device.

Additional aspects will be set forth in part in the description which follows and, in part, will be apparent from the description, or may be learned by practice of the presented embodiments.

In accordance with an aspect of the disclosure, a method for generation of a plurality of portrait effects in an electronic device is provided. The method includes feeding an image captured from the electronic device into an encoder pre-learned using a plurality of features corresponding to the plurality of portrait effects. Further, the method includes extracting, using the encoder, at least one of one or more low level features and one or more high level features from the image. Furthermore, the method includes generating, for the image, one or more first portrait effects of the plurality of portrait effects based on the at least one of the one or more high level features and the one or more low level features by passing the image through one or more first decoders. Thereafter, the method includes generating, for the image, one or more second portrait effects of the plurality of portrait effects based on the at least one of the one or more high level features and the one or more low level features by passing the image through one or more second decoders, wherein each of the one or more first portrait effects, and the one or more second portrait effects is generated in a single inference.

In accordance with another aspect of the disclosure, a system for generation of a plurality of portrait effects in an electronic device is provided. The system includes an encoder, one or more first decoders and one or more second decoders. The encoder is configured to receive an image captured from the electronic device, wherein the encoder is pre-learned using a plurality of features corresponding to the plurality of portrait effects. The encoder is further configured to extract at least one of one or more low level features and one or more high level features from the image. Further, the one or more decoders are configured to generate, for the image, one or more first portrait effects of the plurality of portrait effects based on the at least one of the one or more high level features and the one or more low level features. Furthermore, the one or more second decoders are configured to generate, for the image, one or more second portrait effects of the plurality of portrait effects based on the at least one of the one or more high level features and the one or more low level features, wherein each of the one or more first portrait effects and the one or more second portrait effects is generated in a single inference.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings in which:

FIG. 6 illustrates a flow diagram depicting a process for training a single DNN model according to an embodiment of the disclosure;

FIGS. 9A, 9B, 9C, 9D, 9E, 9F, 9G, and 9H illustrate a series of second stages of a plurality of stages of training an encoder, one or more first decoders, one or more second decoders, and a defocus map decoder according to various embodiments of the disclosure;

The same reference numerals are used to represent the same elements throughout the drawings.

DETAILED DESCRIPTION

Figure 1:
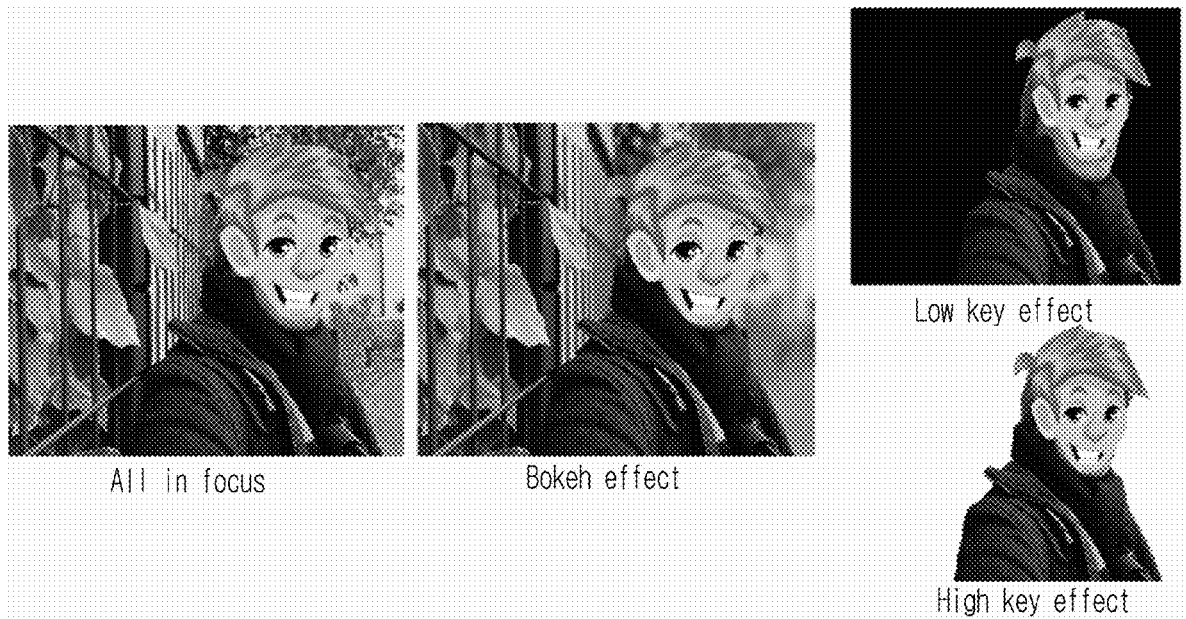
FIG. 1 illustrates a plurality of portrait effects according to the related art.
Figure 2A:
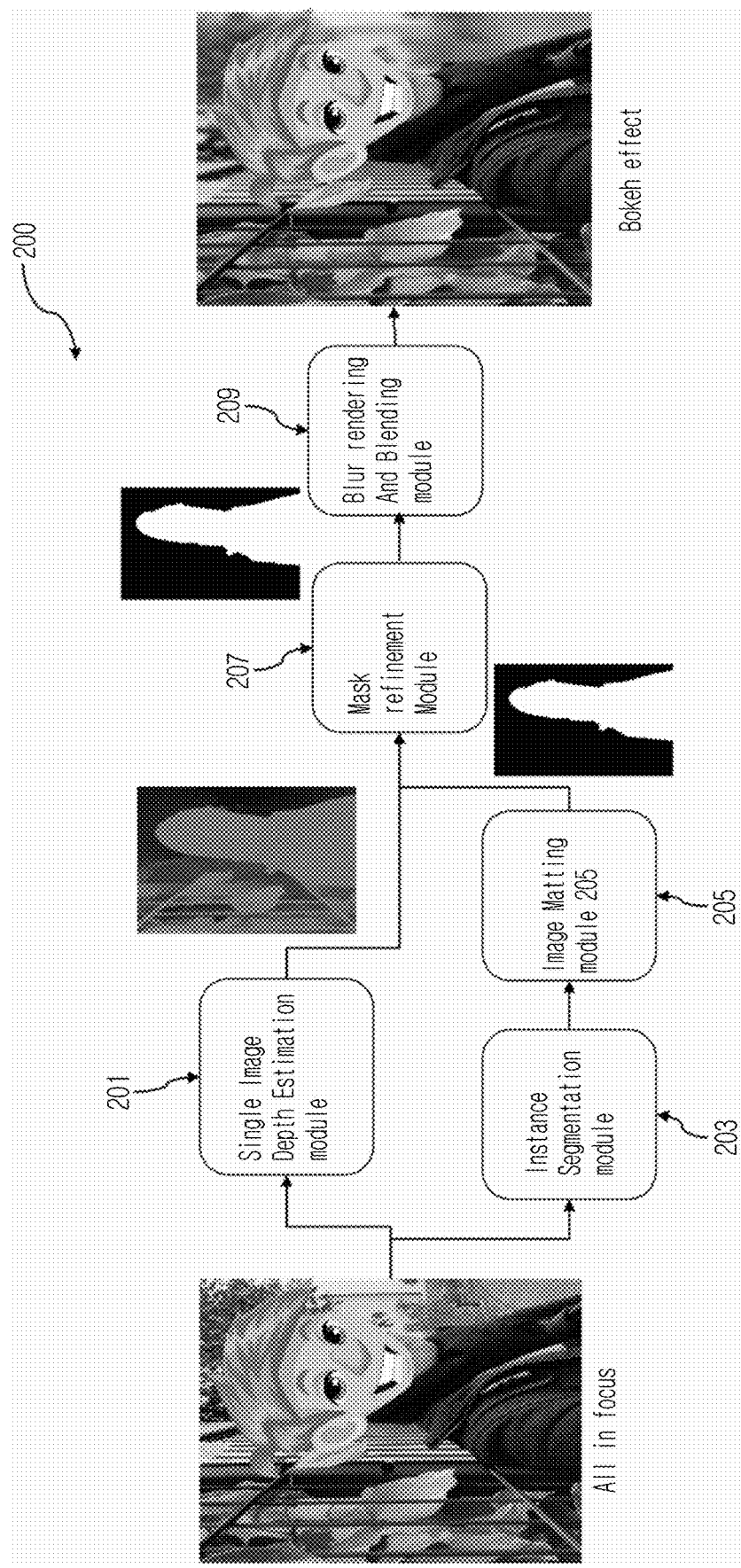
FIG. 2A illustrates a block diagram of generating a Bokeh effect computationally according to the related art.
Figure 2B:
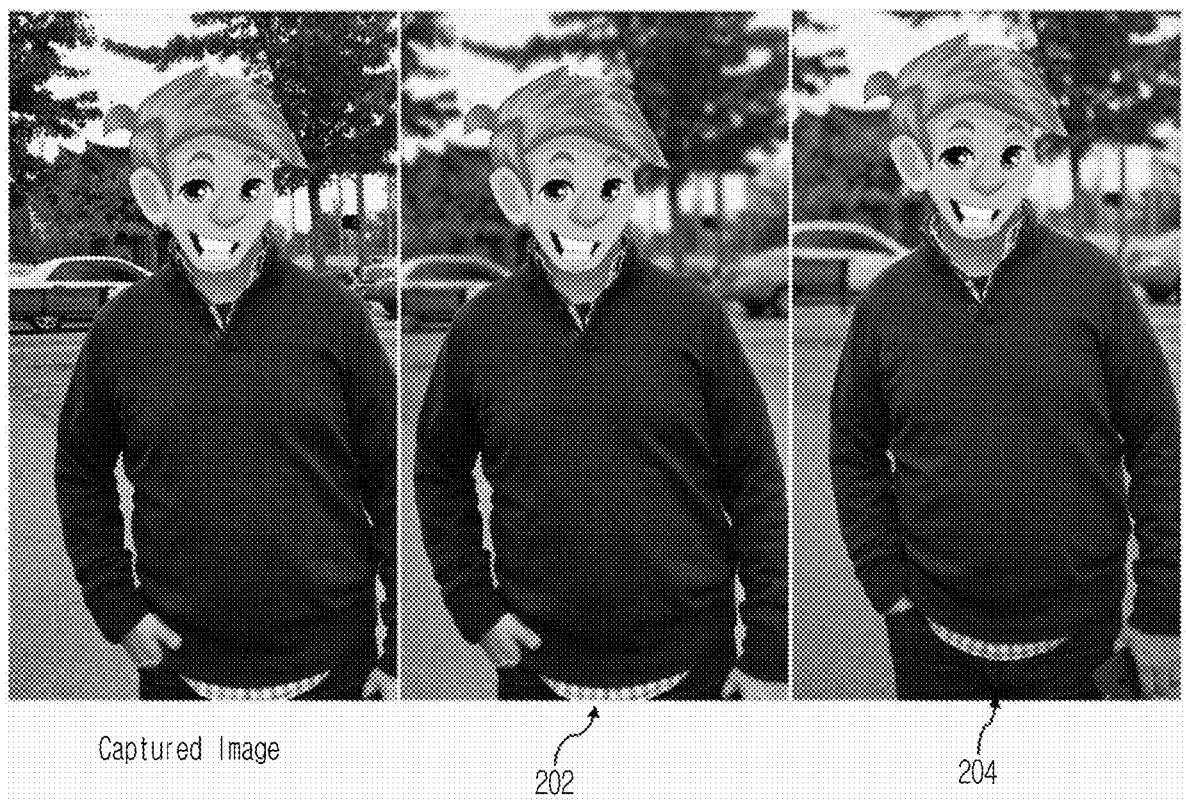
FIG. 2B illustrates a comparison between the Bokeh effect generated by the computational method and a DSLR according to the related art.
Figure 3:
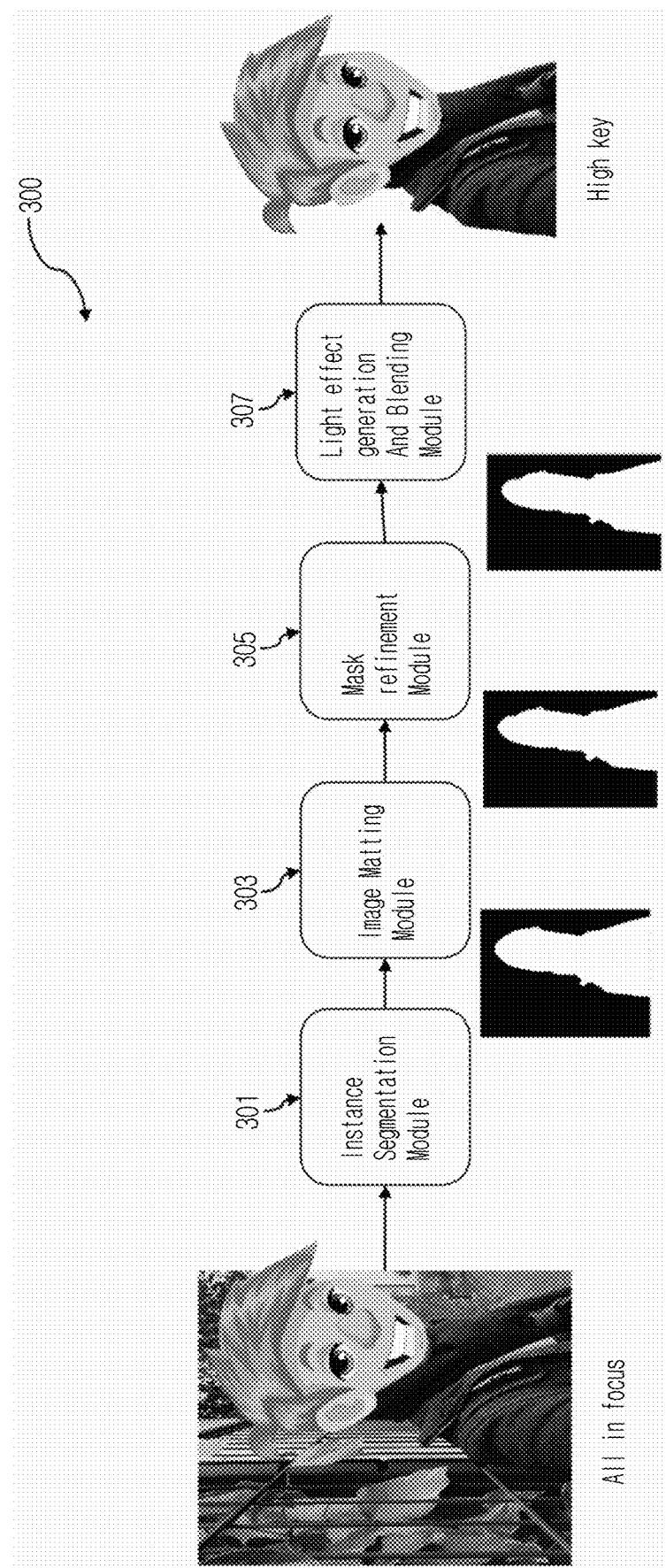
FIG. 3 illustrates a block diagram of generating a studio lighting effect computationally according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least an embodiment of the disclosure. Thus, appearances of the phrase "in an embodiment", "in another embodiment", and similar language throughout this specification may, but do not necessarily, all refer to the same embodiment.

The terms "comprise", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks that carry out a described function or functions. These blocks, which may be referred to herein as units or modules or the like, are physically implemented by analog or digital circuits, such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports, such as printed circuit boards and the like. The circuits constituting a block may be implemented by dedicated hardware, by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents, and substitutes in addition to those which are particularly set out in the accompanying drawings. Although the terms first, second, or the like, may be used herein to describe various elements, these elements should not be limited by these terms. These terms are generally only used to distinguish one element from another.

Referring to the drawings, and more particularly to FIGS. 4 to 6, 7A, 7B, 8A, 8B, 9A to 9H, 10A, 10B, and 11, where similar reference characters denote corresponding features consistently throughout the figures, there are shown preferred embodiments.

Figure 4:
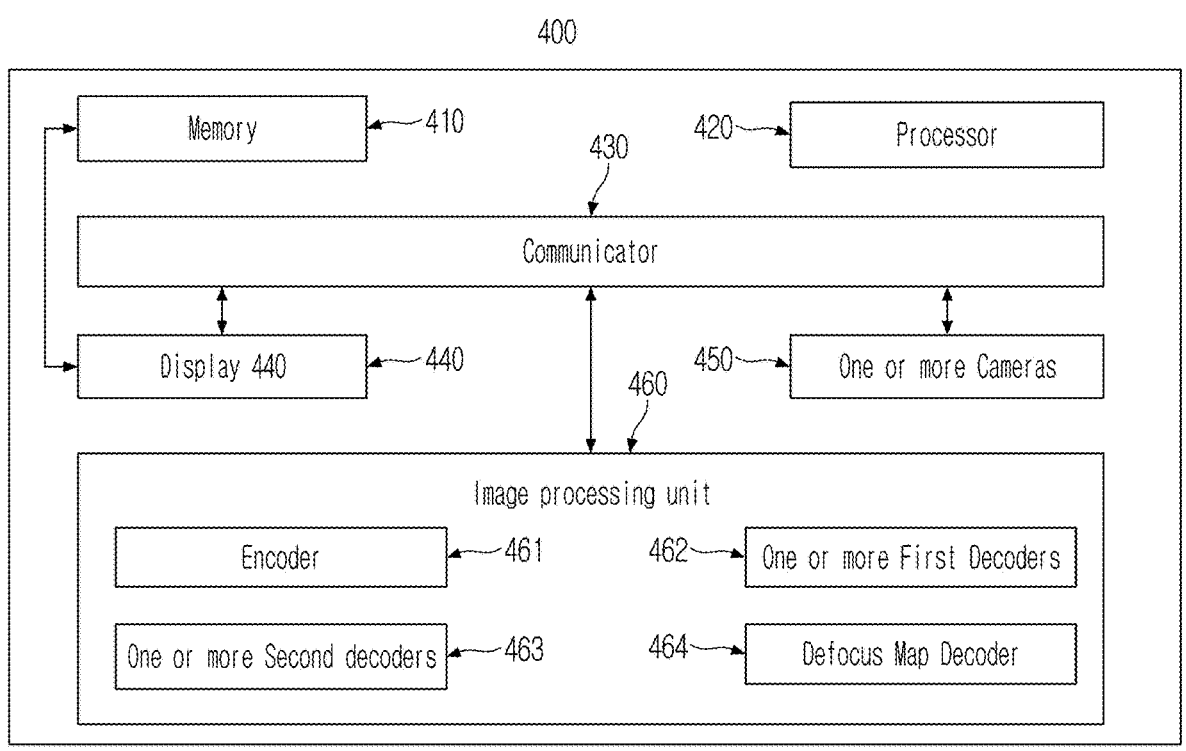
FIG. 4 illustrates a block diagram of a system for generation of a plurality of portrait effects in an electronic device according to an embodiment of the disclosure.

FIG. 4 illustrates a block diagram of system 400 for generation of a plurality of portrait effects in an electronic device according to an embodiment of the disclosure.

Figure 5:
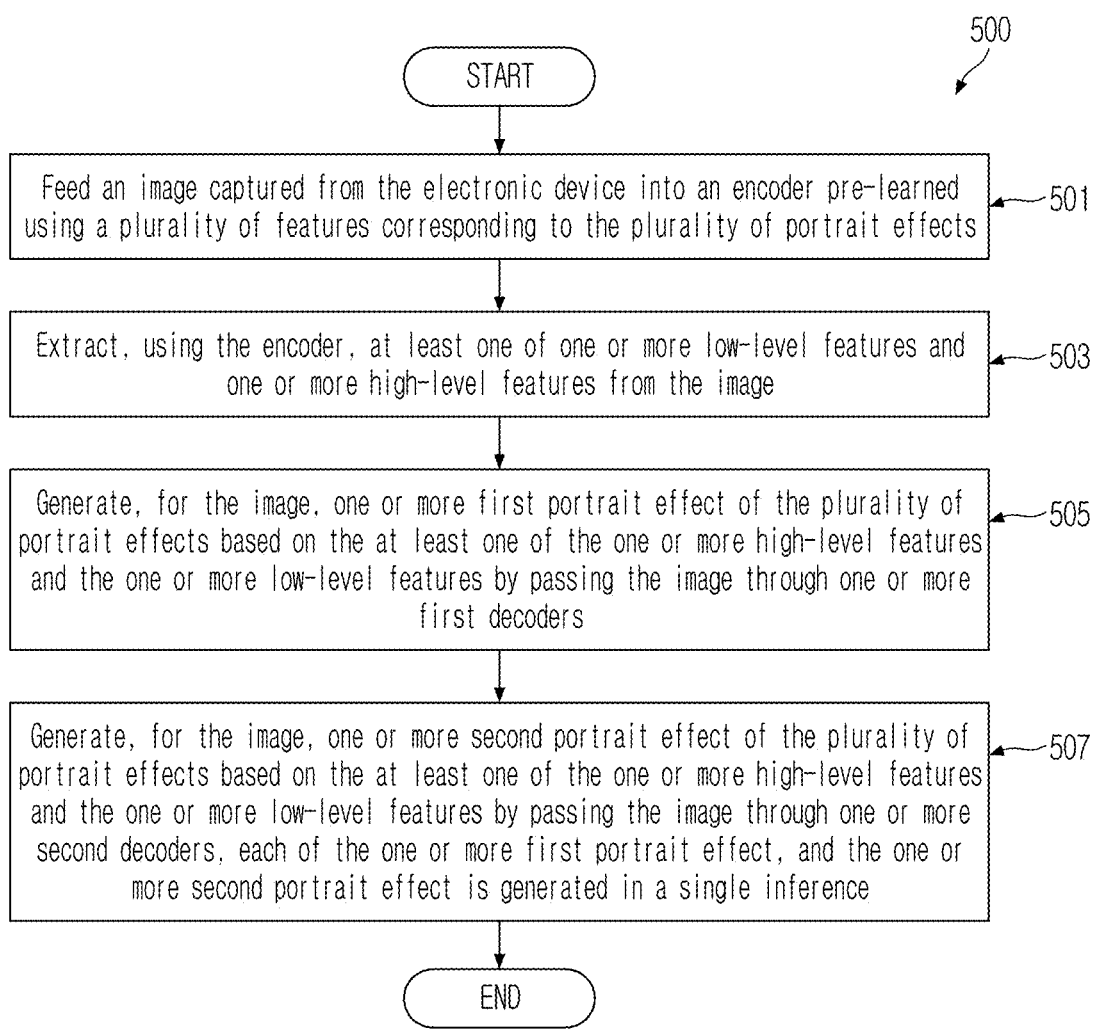
FIG. 5 illustrates a flow diagram depicting a method for generation of a plurality of portrait effects in an electronic device according to an embodiment of the disclosure.

FIG. 5 is a flow diagram illustrating a method for generation of a plurality of portrait effects in an electronic device according to an embodiment of the disclosure. For the sake of brevity, the description of FIGS. 4 and 5 are explained in conjunction with each other.

Referring to FIG. 4, in an embodiment of the disclosure, the system 400 may include a memory 410, a processor 420, a communicator 430, a display 440, one or more cameras 450, and an image processing unit 460.

In an embodiment of the disclosure, the memory 410 may store the generated plurality of portrait effects and information related to the generation of the plurality of portrait effects, such as ground truth data generated for each of the plurality of portrait effects. Further, the memory 410 may store instructions to be executed by the processor 420 for generating the plurality of portrait effects, as discussed throughout the disclosure. The memory 410 may include non-volatile storage elements. Examples of such non-volatile storage elements may include magnetic hard discs, optical discs, floppy discs, flash memories, or forms of electrically programmable read only memory (EPROM) or electrically erasable and programmable ROM (EEPROM). In addition, the memory 410 may, in some examples, be considered a non-transitory storage medium configured to store instructions/data to be executed by one or more processors (e.g., processor 420) to perform one or more function(s) or method(s), as discussed throughout the disclosure. The term "non-transitory" may indicate that the storage medium is not embodied in a carrier wave or a propagated signal. However, the term "non-transitory" should not be interpreted that the memory 410 is non-movable. In certain examples, a non-transitory storage medium may store data that can, over time, change (e.g., in a random access memory (RAM) or cache). The memory 410 can be an internal storage unit, or it can be an external storage unit of the electronic device, a cloud storage, or any other type of external storage.

The processor 420 may communicate with the memory 410, the communicator 430, the display 440, the one or more cameras 450, and the image processing unit 460. The processor 420 may be configured to execute instructions stored in the memory 410 and to perform various processes to generate the plurality of portrait effects, as discussed throughout the disclosure. The processor 420 may include one or a plurality of processors, maybe a general-purpose processor, such as a central processing unit (CPU), an application processor (AP), or the like, a graphics-only processing unit, such as a graphics processing unit (GPU), a visual processing unit (VPU), and/or an Artificial intelligence (AI) dedicated processor, such as a neural processing unit (NPU).

The communicator 430 may be configured for communicating internally between internal hardware components and with external devices (e.g., server, another electronic device) via one or more networks (e.g., Radio technology). The communicator 430 may include an electronic circuit specific to a standard that enables wired or wireless communication.

The display 440 may be made of a liquid crystal display (LCD), a light emitting diode (LED), an organic light emitting diode (OLED), or another type of display. The one or more cameras 450 may include one or more image sensors (e.g., charged coupled device (CCD), complementary metal-oxide semiconductor (CMOS)) to capture one or more images/image frames/video to be processed for the generation of the plurality of portrait effects in the image. In an alternative embodiment of the disclosure, the one or more cameras 450 may not be present, and the system 400 may process an image/video received from an external device or process a pre-stored image/video displayed at the display 440. In an embodiment of the disclosure, the plurality of portrait effects may be displayed on the display 440.

The image processing unit 460 may be implemented by processing circuitry, such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports, such as printed circuit boards and the like.

In an embodiment of the disclosure, the image processing unit 460 may include an encoder 461, one or more first decoders 462, one or more second decoders 463, and a defocus map decoder 464, collectively referred to as modules/units 461-464. The image processing unit 460 and the one or more modules/units 461-464 in conjunction with the processor 420 may perform one or more functions/methods, as discussed throughout the disclosure.

It should be noted that the system 400 may be a part of the electronic device. In another embodiment of the disclosure, the system 400 may be connected to the electronic device. Examples of the electronic device may include but are not limited to, a smartphone, a tablet computer, a personal digital assistance (PDA), an Internet of things (IoT) device, a wearable device, or any other electronic device capable of capturing and/or processing images or video data.

At least one of the plurality of modules/units may be implemented through an AI model. A function associated with AI may be performed through the non-volatile memory, the volatile memory, and the processor 420.

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning technique to a plurality of learning data, a predefined operating rule, or an AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

According to the disclosure, in a method of an electronic device, the method for the generation of the plurality of portrait effects in the electronic device may use an artificial intelligence model to recommend/execute the plurality of portrait effects by using data generated by various modules/units. The processor may perform a pre-processing operation on the data to convert it into a form appropriate for use as an input for the artificial intelligence model. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training technique. The artificial intelligence model may include a plurality of neural network layers. Each of the plurality of neural network layers includes a plurality of weight values and performs neural network computation by computation between a result of computation by a previous layer and the plurality of weight values.

Referring to FIG. 5, at operation 501, the method 500 may include feeding an image captured from the electronic device into an encoder 461 pre-learned using a plurality of features corresponding to the plurality of portrait effects. In an embodiment of the disclosure, the image may be captured using the one or more cameras 450. It should be noted that the image may be a still image or may be a part of a video. In an alternate embodiment of the disclosure, the image/video may be pre-stored in the electronic device. In another embodiment of the disclosure, the image/video may be received from an external device. The encoder 461 may be trained to learn the plurality of portrait effects using the plurality of features corresponding to the plurality of portrait effects. In an embodiment of the disclosure, the plurality of features may refer to one or more low level features, such as texture, colors, or edges of an object in the image and one or more high level features, such as features related to semantic learning, e.g., a shape of the object in the image. In a further embodiment of the disclosure, the encoder may be pretrained to learn the plurality of portrait effects, which is further explained in reference to FIG. 6.

In an embodiment of the disclosure, the plurality of portrait effects may include one or more first portrait effects and one or more second portrait effects. The one or more first portrait effects may relate to depth-related camera features, and the one or more second portrait effects may relate to segmentation-related camera features. In an embodiment of the disclosure, the one or more first portrait effects may include at least one of a studio effect, a Big circle effect, or the Bokeh effect, whereas the one or more second portrait effects may include at least one of a High Key portrait effect, a Low Key portrait effect, a color backdrop effect, a color point effect, a spin effect, or a zoom effect. It should be noted that the studio effect, the Big circle effect and the Bokeh effect are a few examples of the one or more first portrait effects. Any other portrait effect which is related to the depth-related camera features is a part of the one or more first portrait effects and will fall within the scope of the disclosure. Similarly, the High Key portrait effect, the Low Key portrait effect, the color backdrop effect, the color point effect, the spin effect, and the zoom effect are a few examples of the one or more second portrait effects. Any other portrait effect which is related to the segmentation-related camera features is a part of the one or more second portrait effects and will fall within the scope of the disclosure.

Referring back to FIG. 5, at operation 503, the method 500 may include extracting, using the encoder 461, at least one of one or more low level features and one or more high level features from the image. In an embodiment of the disclosure, the encoder 461 may be trained to extract at least one of the one or more low level features and one or more high level features from the image, which is further explained in reference to FIG. 6. In an embodiment of the disclosure, the one or more low level features may include features like texture, colors, edges of an object in the image, and the one or more high level features may include features related to semantic learning, such as a shape of the object in the image. It should be noted that the above-mentioned features are a few examples of the one or more low level features and the one or more high level features and may encompass any other features of the image, which will fall within the scope of the disclosure.

At operation 505, the method 500 may include generating, for the image, the one or more first portrait effects of the plurality of portrait effects based on the at least one of the one or more high level features and the one or more low level features by passing the image through one or more first decoders 462. In an embodiment of the disclosure, the one or more first decoders 462 may include a Bokeh decoder. In another embodiment of the disclosure, the one or more first decoders 462 may include any decoder associated with a portrait effect related to depth-related camera features, and any such decoder will fall within the scope of the disclosure. In an embodiment of the disclosure, the one or more first decoders 462 may be trained to generate the one or more first portrait effects, which is further explained in reference to FIG. 6.

At operation 507, the method 500 may include generating, for the image, the one or more second portrait effects of the plurality of portrait effects based on the at least one of the one or more high level features and the one or more low level features by passing the image through the one or more second decoders 463. In an embodiment of the disclosure, the one or more second decoders 463 may include a high key decoder and a low key decoder. In another embodiment of the disclosure, the one or more second decoders 463 may include any decoder associated with a portrait effect related to segmentation-related camera features, and any such decoder will fall within the scope of the disclosure. In an embodiment of the disclosure, the one or more second decoders 463 may be trained to generate the one or more second portrait effects, which is further explained in reference to FIG. 6. Further, it should be noted that each of the one or more first portrait effects and the one or more second portrait effects is generated in a single inference.

Further, in an embodiment of the disclosure, the encoder 461, the one or more first decoders 462 and the one or more second decoders 463 may be comprised within a single NN model, such as a deep NN (DNN) model. In another embodiment of the disclosure, the image processing unit 460 may be comprised within the single DNN model.

FIG. 6 illustrates a flow diagram depicting a process for training a single DNN model according to an embodiment of the disclosure.

Referring to FIG. 6, at operation 601, the method 600 may include generating ground truth data for each of the one or more first portrait effects, and the one or more second portrait effects using a plurality of data modules. In an embodiment of the disclosure, the single DNN model may be trained by a training system different from the system 400. Accordingly, these data modules may be a part of the training system. Further, the training system may include one or more processing units to train the DNN model. The one or more processing units may be a general-purpose processor, such as a central processing unit (CPU), an application processor (AP), or the like, a graphics-only processing unit, such as a graphics processing unit (GPU), a visual processing unit (VPU), and/or an artificial intelligence (AI) dedicated processor, such as a neural processing unit (NPU). More particularly, the ground truth data for each of the one or more first portrait effects and the one or more second portrait effects may be generated by a corresponding data module. For example, a first data module may generate the ground truth for each of the one or more first portrait effects. In an alternate embodiment of the disclosure, a plurality of first data modules may generate the ground truth for each of the one or more first portrait effects. Similarly, a second data module may generate the ground truth for each of the one or more second portrait effects. In an alternative embodiment of the disclosure, a plurality of second data modules may generate the ground truth for each of the one or more second portrait effects.

In an embodiment of the disclosure, the first data module may generate the ground truth data for the one or more first portrait effects using a shallow depth of field of an input color image captured using a first aperture of a lens of a camera and a wide depth of field of the input color image captured using a second aperture of the lens of the camera. In an embodiment of the disclosure, the first aperture may be f/16 and the second aperture may be f/8, where "f" is a focal length of the lens of the camera. Thereafter, the first data module may generate a ground truth defocus map to generate the ground truth data for the one or more first portrait effects. The generation of the ground truth defocus map is further explained in reference to FIG. 7A.

Figure 7A:
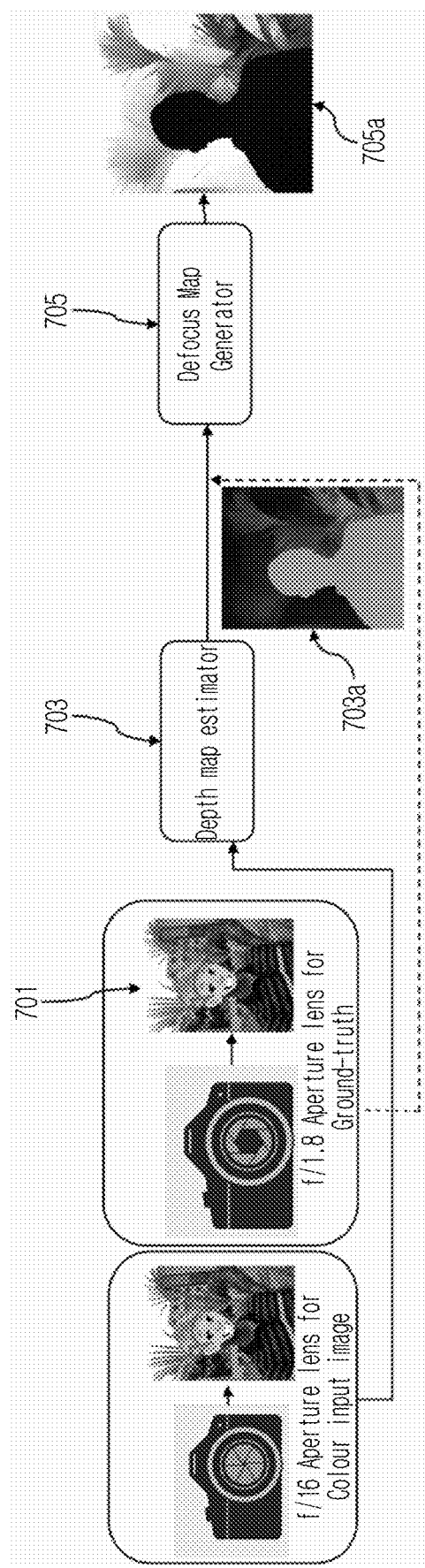
FIG. 7A illustrates a block diagram for generating a ground truth defocus map according to an embodiment of the disclosure.

FIG. 7A illustrates a block diagram for generating a ground truth defocus map according to an embodiment of the disclosure.

Referring to FIG. 7A, a depth map estimator 703 generates a depth map 703a. In an embodiment of the disclosure, the depth map 703a may be generated using known depth estimation techniques. Accordingly, the depth values may be between 0 to 255 which represent the distance of the object from the camera. Thereafter, a defocus map generator 705 may generate a defocus map 705a based on the depth map 703a. In an embodiment of the disclosure, the defocus map generator 705 may generate an initial defocus map 705a using computer vision techniques, such as brightness/contrast enhancements, depth value rescaling, and inverse depth. The defocus map generator 705 may further refine the generated initial defocus map by analyzing blur quantity in ground-truth image 703 to get the defocus map 705a.

Figure 7B:
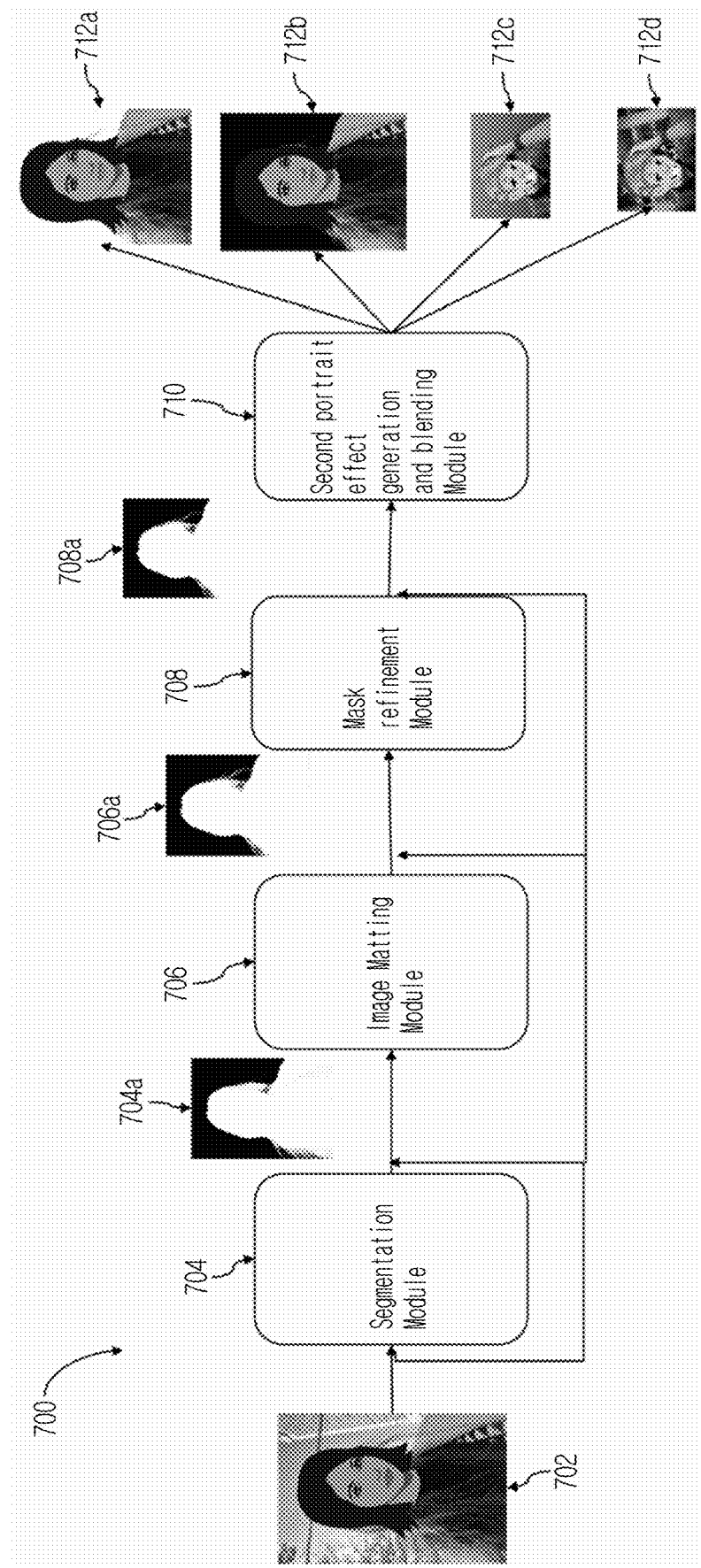
FIG. 7B illustrates a block diagram for generating ground truth for one or more second portrait effects according to an embodiment of the disclosure.

Referring back to operation 601, FIG. 7B illustrates a block diagram 700 for generating the ground truth data for the one or more second portrait effects, in according to an embodiment of the disclosure.

Referring to FIG. 7B, a segmentation module 704 receives an input color image 702 (which is the same as 701) and generates a segmentation mask 704a of the input color image. In an embodiment of the disclosure, the segmentation module 704 may generate the segmentation mask 704a using a known segmentation technique. In the generated segmentation mask 704a, 255 pixel values represent the foreground of the input image 702, and 0 pixel values represent the background of the input image 702. Then, the image matting module 706 generates a high-resolution matting mask 706*a* from the segmentation mask 704*a*. In an embodiment of the disclosure, high-resolution may refer to the same resolution as compared to the input color image 702. In an embodiment of the disclosure, the image matting module 706 generates the high-resolution matting mask 706*a* using a matting technique. The generated matting mask 706*a* has accurate segmentation with refined boundary details. Pixel values of the generated matting mask 706*a* are within a range of 0 to 255. Then, the mask refinement module 708 refines the generated matting mask 706*a* and provides a refined mask 708*a*. In an embodiment of the disclosure, the mask refinement module 708 refines the matting mask 706*a* using computer vision techniques, such as guided filter, joint bilateral filter, or the like. Thereafter, a second portrait effect generation and blending module 710 generates the one or more second portrait effects 712*a*-712*d* on the input color image 702. In particular, the second portrait effect generation and blending module 710 changes one or more color parameters of the input color image 702 and replaces a background of the input color image 702 with a predetermined background based on the one or more second portrait effects to generate the one or more second portrait effects. For example, in the case of a High Key portrait effect, the second portrait effect generation and blending module 710 may prepare a light effect as per the High Key portrait effect using computer vision techniques, such as color image to gray conversion, change in contrast and brightness, and may replace the background of the input color image 702 with a white background by alpha blending using the refined mask 708*a* to generate the High Key portrait effect 712*a*. Similarly, in the case of a Low Key portrait effect, the second portrait effect generation and blending module 710 may prepare a light effect as per the Low Key portrait effect using computer vision techniques, such as color image to gray conversion, change in contrast and brightness, and may replace the background of the input color image 702 with a black background by alpha blending using the refined mask 708*a* to generate the Low Key portrait effect 712*b*. Similarly, in the case of the color backdrop effect 712*c*, the background is replaced with the nearest color in the foreground of the color input image 702. Similarly, in case of the color point effect 712*d*, the background is changed from color to gray. It should be noted that 712*a*-712*d* are a few examples of the one or more second portrait effects and any other portrait effects related to segmentation-related camera features are well within the scope of the disclosure. Further, it should be noted that the terms like defocus map, segmentation mask, matting mask, refined mask, or the like, are well-known terms to a person skilled in the art, and hence, the description of such terms and process for the generation of such masks is not provided here for the sake of brevity of the disclosure.

Referring back to FIG. 6, at operation 603, the method 600 may include training the encoder 461 in a plurality of stages using the generated ground truth to extract the at least one of the one or more low level features and the one or more high level features from the image, which is further explained in reference to FIGS. 9A to 9H, 10A, and 10B.

Then, at operation 605, the method 600 may include training the encoder 461, the one or more first decoders 462, the one or more second decoders 463, and the defocus map decoder 464 associated with the one or more first decoders 462 in a plurality of stages using the generated ground truth data to generate the one or more first portrait effects and the one or more second portrait effects, which is further explained in reference to FIGS. 8A, 8B, 9A, 9B, 9C, 9D, 9E, 9F, 9G, 9H, 10A, and 10B.

Figure 8A:
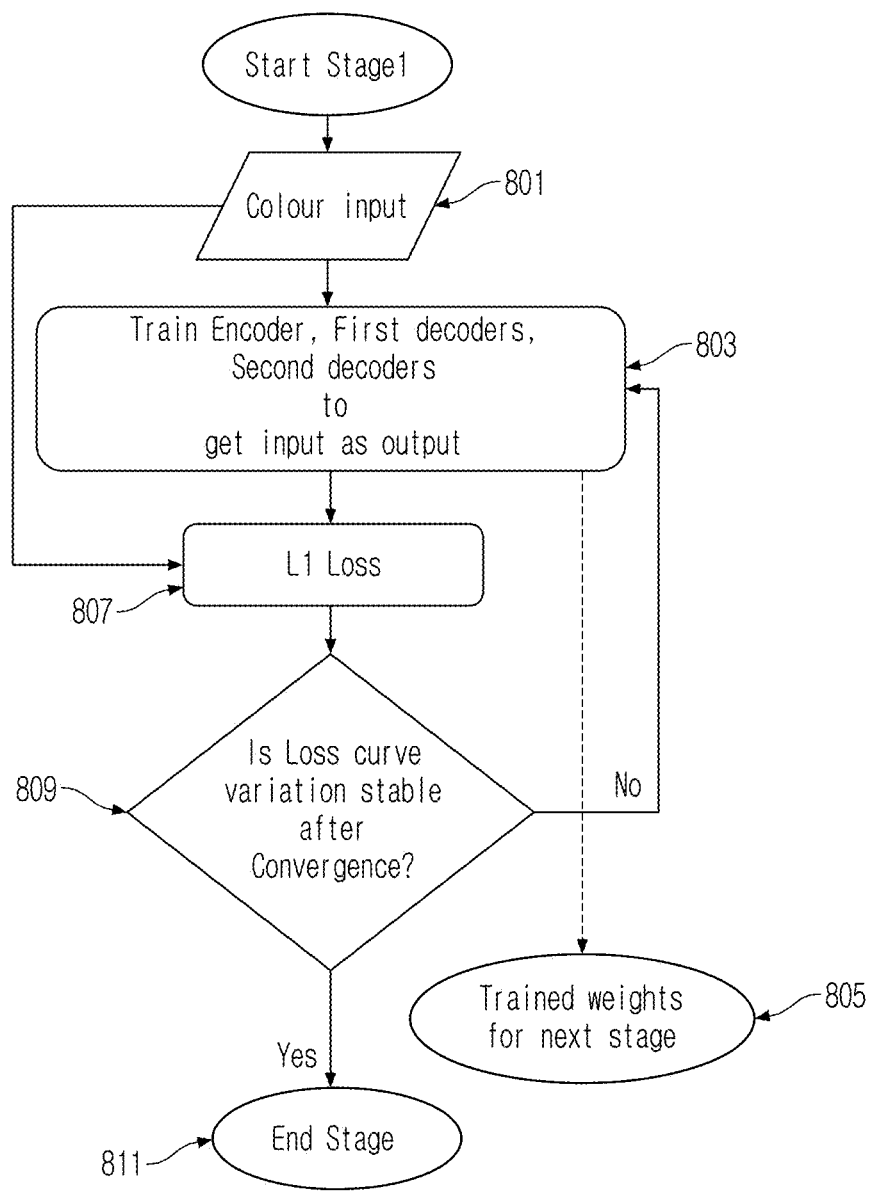
FIGS. 8A and 8B illustrate a first stage of a plurality of stages of training an encoder, one or more first decoders, and one or more second decoders according to various embodiments of the disclosure.
Figure 8B:
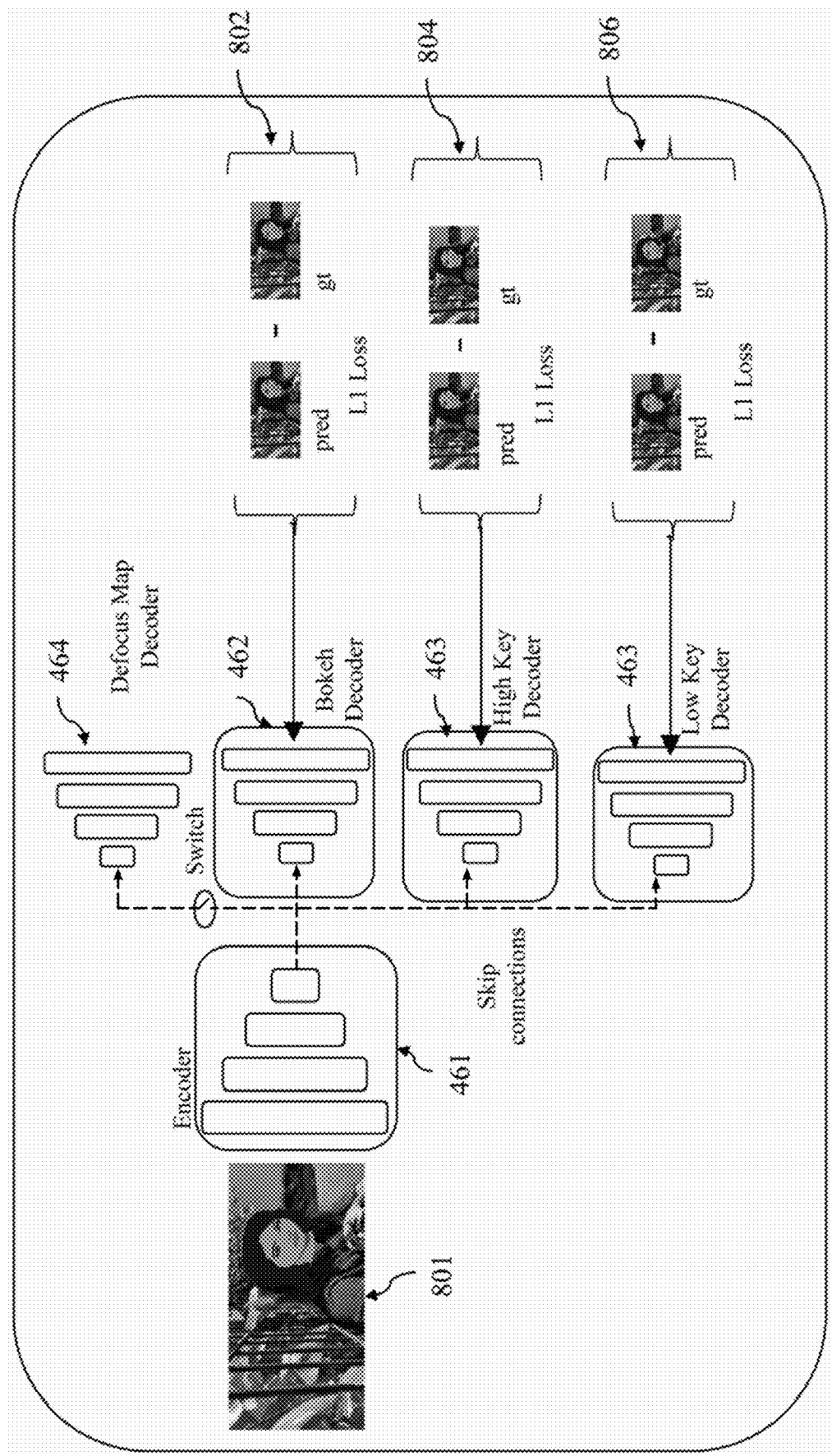

FIGS. 8A and 8B illustrate a first stage of a plurality of stages of training an encoder, one or more first decoders, and one or more second decoders according to various embodiments of the disclosure.

Referring to FIG. 8A, it illustrates a flowchart 800*a* for the first stage of the training, according to an embodiment of the disclosure.

Referring to FIG. 8B, it illustrates a block diagram for the first stage of the training, according to an embodiment of the disclosure.

For the sake of brevity, FIGS. 8A and 8B are explained in conjunction with each other. Referring to FIG. 8A, the encoder 461, the one or more first decoders 462, and the one or more second decoders 463 are trained in the first stage, i.e., stage 1 of the plurality of stages to provide an input image as an output image. More particularly, at operation 801, the input image 801 is received. Referring to FIG. 8B, the input image 801 is received at the encoder 461. At operation 803, the encoder 461, the one or more first decoders 462, and the one or more second decoders 463 are trained to generate the output image as close as possible to the input image 801. In particular, the encoder 461 generates a plurality of feature maps from the input image 801, as output. Then, the generated feature maps are provided to the one or more first decoders 462 and the one or more second decoders 463, as input. The one or more first decoders 462 and the one or more second decoders 463 generate output images 802-806, using the plurality of feature maps. As can be seen from FIG. 8B, the output images 802-806 provided by the one or more first decoders 462 and the one or more second decoders 463 are the same as the input image 801. At operation 805, one or more first weights associated with each neural network layer of the encoder 461, the one or more first decoders 462, and the one or more second decoders 463 are obtained for the next stage, i.e., first sub-stage of the series of second stages. At operation 807, L1 loss is computed by each of the one or more first decoders 462, and the one or more second decoders 463 by determining a difference between the generated output images 802-806 and the input image 801 taken as ground truth. At operation 809, it is determined if a loss curve variation is stable after convergence. In an embodiment of the disclosure, the loss curve may refer to a graph representing loss value L1 vis-à-vis a number of training iteration. In particular, the encoder 461, the one or more first decoders 462, and the one or more second decoders 463 are trained for a number of times, i.e., a number of training iterations till the loss curve variation is stable. During the initial training iteration, e.g., 1-5 iterations, the loss value is high. However, as the training progresses, i.e., the number of training iterations are increased, the loss value L1 decreases exponentially and becomes stable after a certain number of the training iteration. If there is not much variation in the loss value, then it is determined that the loss curve is stable. If the loss curve variation is determined to be stable, then stage 1 is ended at operation 811. It should be noted that the one or more first weights associated with each neural network layer of the encoder 461, the one or more first decoders 462, and the one or more second decoders 463 are modified after every training iteration until the loss curve variation is determined to be stable at operation 809 and these one or more first weights are carried forward to the first sub-stage of the series of second stages of FIG. 9A. If not, then the training is continued by moving back to operation 803.

Referring to FIG. 8B, the defocus map decoder 464 is not trained in this stage. In particular, the defocus map decoder 464 is a support decoder which predicts depth map related output, i.e., a defocus map, to improve overall depth gradient quality in the one or more first portrait effects, such as the Bokeh effect. In this stage, the defocus map decoder 464 is not trained because the defocus map decoder 464 is not used to predict give red, green, blue (RGB) color related output. Other decoders, i.e., the one or more first decoders 462 and the one or more second decoders 463 are trained in this step to familiarize with input image colors because these decoders predict RGB color related outputs. Further, it should be noted that FIG. 8B illustrates an embodiment. Accordingly, a Bokeh decoder has been trained as the one or more first decoders 462. A High Key decoder and a Low Key decoder are trained as the one or more second decoders 463.

After training the encoder 461, the one or more first decoders 462, and the one or more second decoders 463 in the first stage, the encoder 461, the one or more first decoders 462, the one or more second decoders 463, and the defocus map decoder 464 are trained in a series of second stages of the plurality of stages to generate the one or more first portrait effects and the one or more second portrait effects, as shown in FIGS. 9A, 9B, 9C, 9D, 9E, 9F, 9G, and 9H. In an embodiment of the disclosure, the one or more first decoders 462, and the defocus map decoder 464 are trained using the ground truth data for each of the one or more first portrait effects and the one or more second portrait effects and the input image, as discussed below in reference to FIGS. 9A to 9H.

Figure 9A:
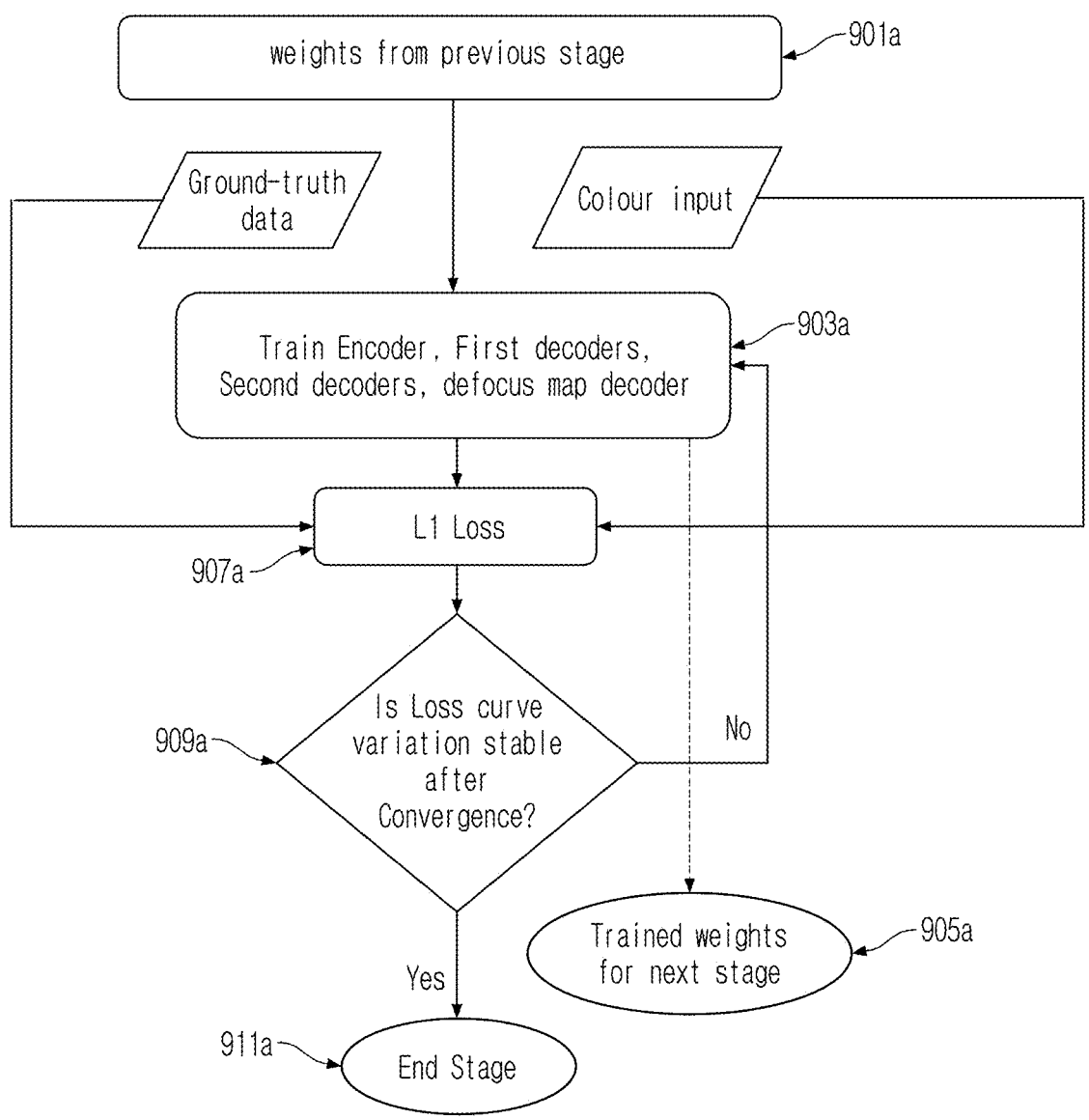

FIG. 9A illustrates a flowchart 900a for a first sub-stage of series of second stages of training according to an embodiment of the disclosure.

Figure 9B:
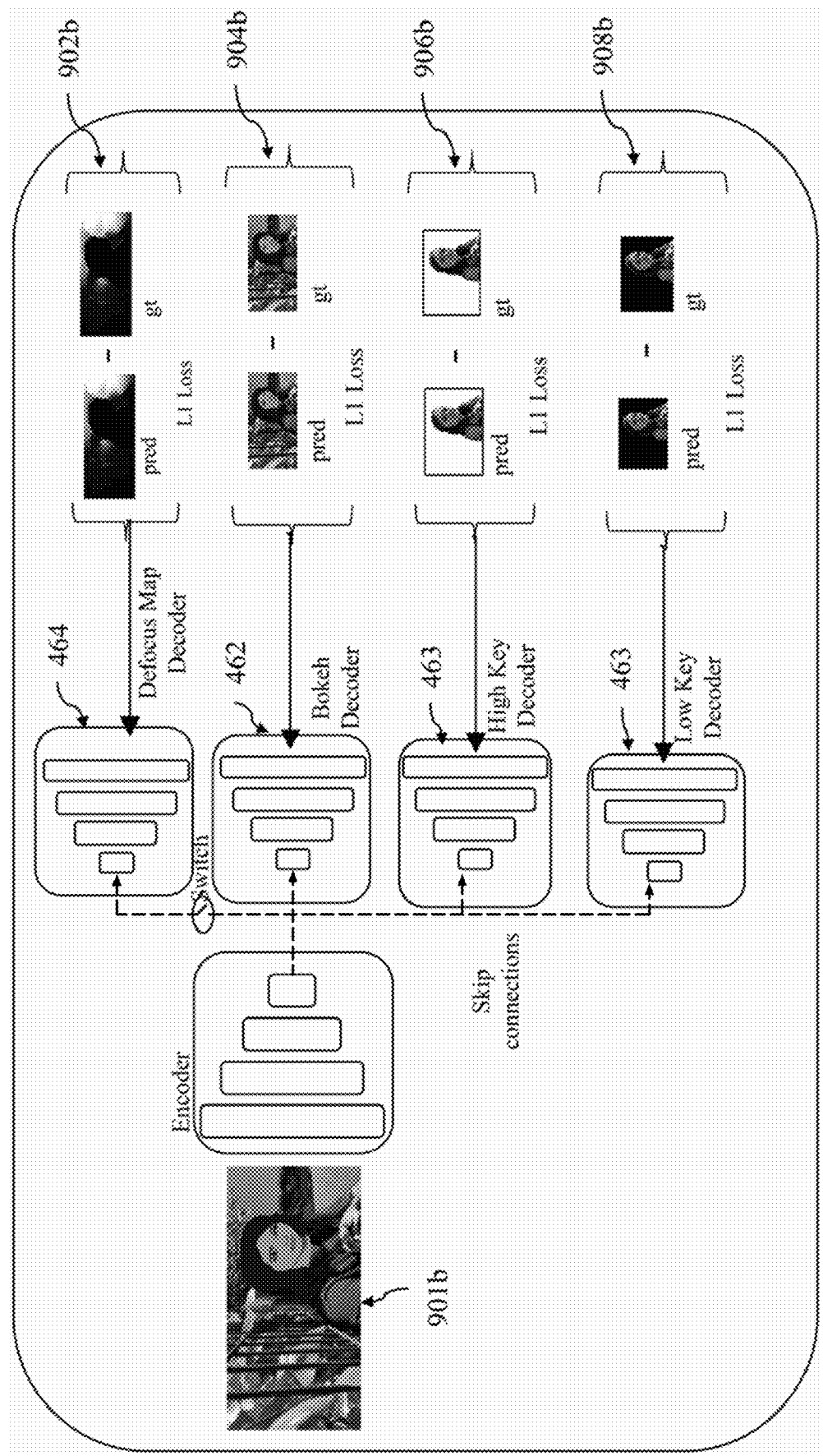

FIG. 9B illustrates a block diagram for a first sub-stage of a series of second stages of training according to an embodiment of the disclosure.

Referring to FIGS. 9A and 9B, they are explained in conjunction with each other. Referring to FIG. 9A, at operation 901a, the one or more first weights associated with each neural network layer of the encoder 461, the one or more first decoders 462, and the one or more second decoders 463 from the previous stage, i.e., stage 1 of FIG. 8A are received. At operation 903a, the encoder 461, the one or more first decoders 462, the one or more second decoders 463, and the defocus map decoder 464 are trained to generate the one or more first portrait effects and the one or more second portrait effects. In particular, the encoder 461 is trained to generate the one or more first portrait effects and the one or more second portrait effects. Accordingly, the encoder 461 generates a plurality of feature maps from the input image 901a, as output. Then, the generated feature maps are provided to the one or more first decoders 462, the one or more second decoders 463, and the defocus map decoder 464, as input. The one or more first decoders 462 and the defocus map decoder 464 generate the one or more first portrait effects, and the one or more second decoders 463 generate the one or more second portrait effects, using the plurality of feature maps. Referring to FIG. 9B, the output images 902b, 904b provided by the defocus map decoder 464 and the one or more first decoders 462 represent the one or more first portrait effects, whereas the output images 906b-908b provided by the one or more second decoders 463 represent the one or more second portrait effects. At operation 905a, one or more second weights associated with each neural network layer of the encoder 461, the one or more first decoders 462, the one or more second decoders 463, and the defocus map decoder 464 are obtained for the next stage, i.e., a second sub-stage of the series of second stages of FIG. 9C. At operation 907a, L1 loss is computed by each of the one or more first decoders 462, the one or more second decoders 463, and the defocus map decoder 464 by determining a difference between the generated output images 902b-908b and respective ground truths. For example, L1 loss may be determined by the one or more first decoders 462, such as a Bokeh decoder by determining the difference between the generated output image 904b and respective ground truth for the one or more first portrait effects, such as the Bokeh effect. Also, the encoder 461 may be trained with the help of the loss L1 to extract the one or more low level features and the one or more high level features from the input image 901b. In this stage, the L1 loss helps in learning the rough estimation of the portrait effects and defocus map in the initial stages of the series of second stages. At operation 909a, it is determined if a loss curve variation is stable after convergence, as discussed in reference to FIG. 8A. If the loss curve variation is determined to be stable, then this stage is ended at operation 911a. If not, then the training is continued by moving back to operation 903a. It should be noted that the one or more second weights associated with each neural network layer of the encoder 461, the one or more first decoders 462, the one or more second decoders 463, and the defocus map decoder 464 are modified after every training iteration until the loss curve variation is determined to be stable at operation 909a and these one or more second weights are carried forward to a second sub-stage of the series of second stages of FIG. 9C. Further, as shown in FIG. 9B, the defocus map decoder 464 is also trained in this stage as the defocus map decoder 464 helps in improving the quality of the one or more first portrait effects. Further, it should be noted that FIG. 9B illustrates an embodiment. Accordingly, a Bokeh decoder has been trained as the one or more first decoders 462. A High Key decoder and a Low Key decoder are trained as the one or more second decoders 463.

Figure 9C:
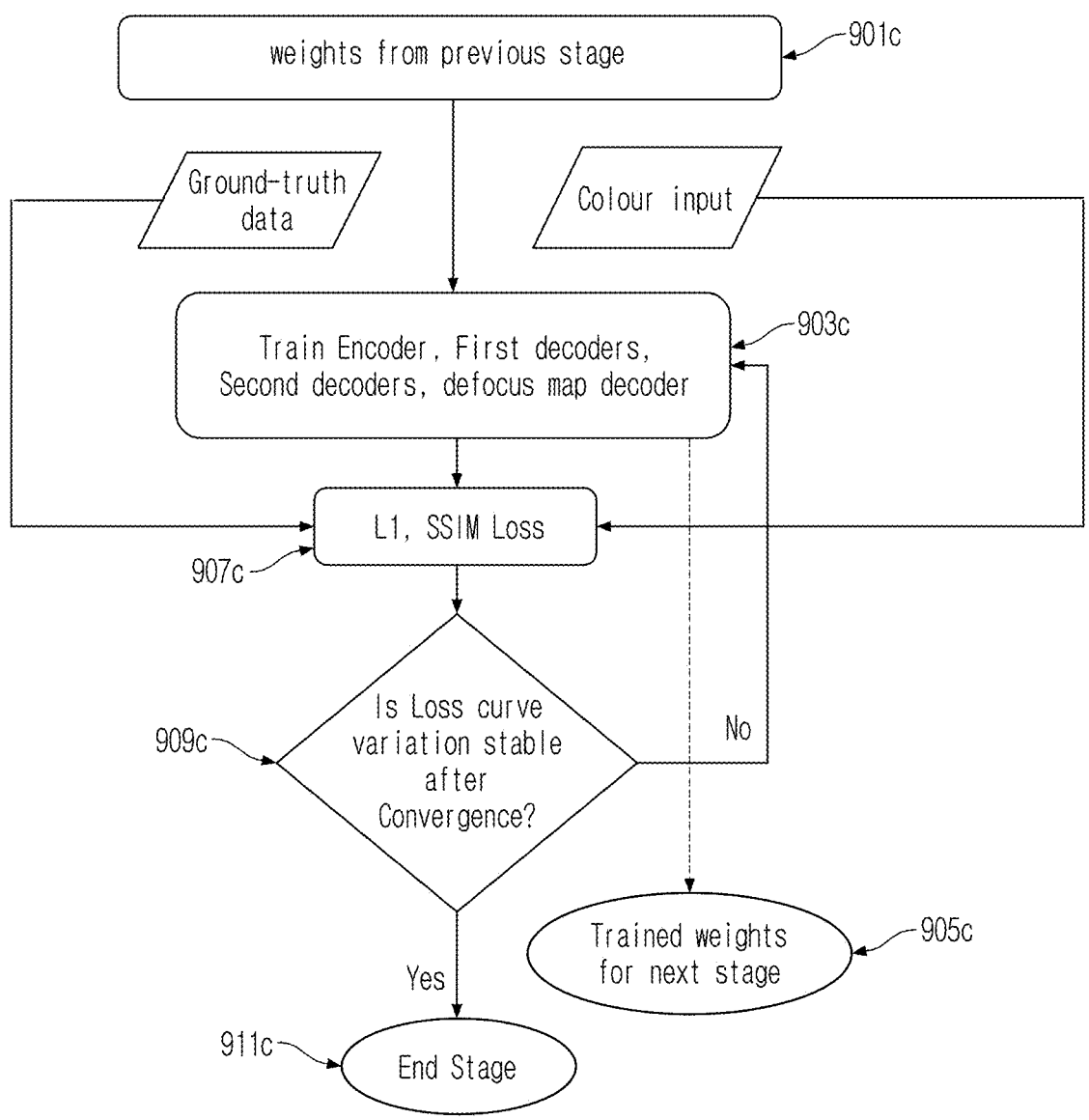

FIG. 9C illustrates a flowchart 900c for a second sub-stage of a series of second stages of training according to an embodiment of the disclosure.

Figure 9D:
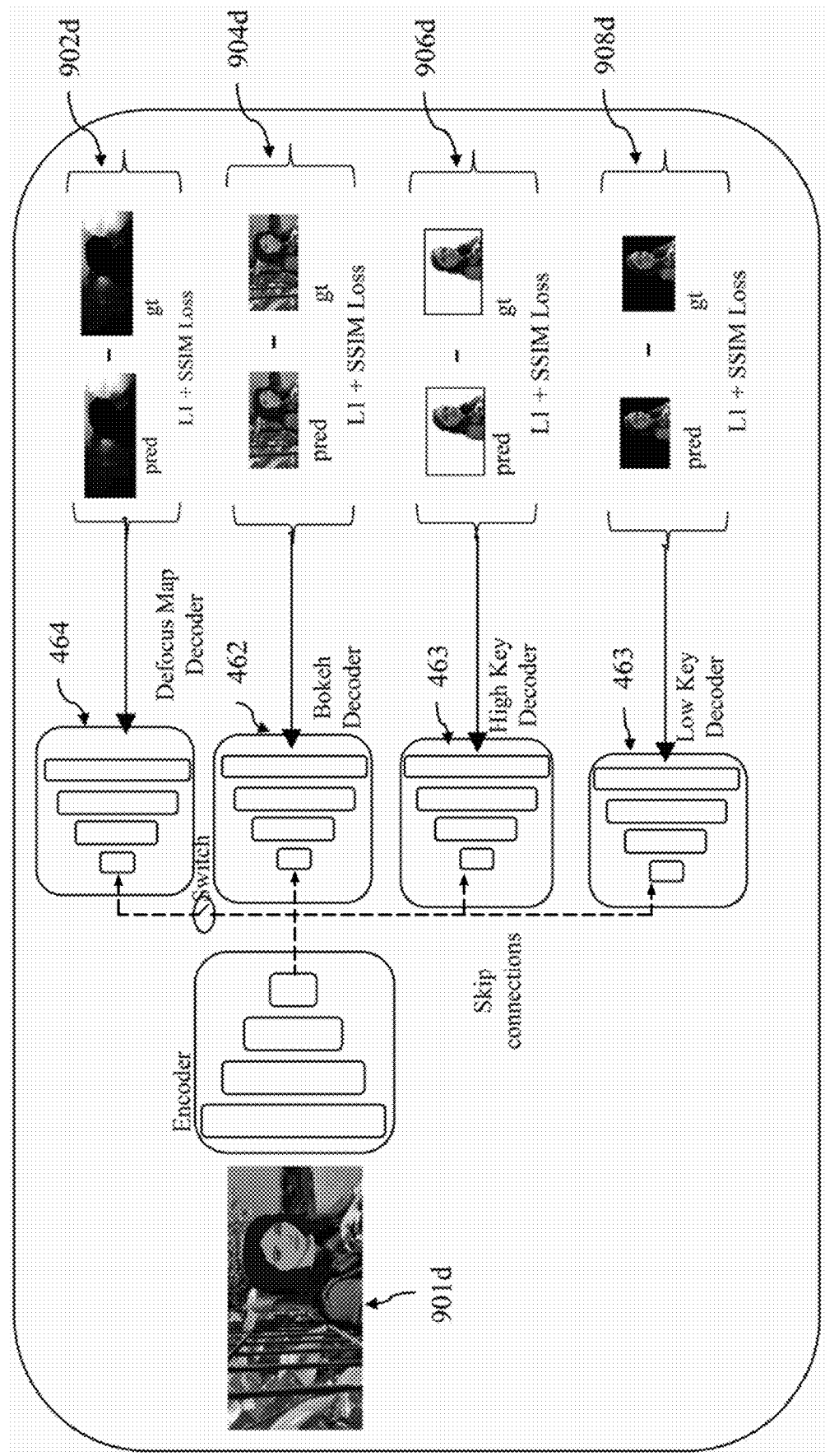

FIG. 9D illustrates a block diagram for a second sub-stage of a series of second stages of training according to an embodiment of the disclosure.

Referring to FIGS. 9C and 9B, they are explained in conjunction with each other. Referring to FIG. 9C, at operation 901c, the one or more second weights associated with each neural network layer of the encoder 461, the one or more first decoders 462, the one or more second decoders 463, and the defocus map decoder 464 from the previous stage, i.e., the first sub-stage of FIG. 9A are received. At operation 903c, the encoder 461, the one or more first decoders 462, the one or more second decoders 463, and the defocus map decoder 464 are trained to generate the one or more first portrait effects and the one or more second portrait effects. In particular, the encoder 461 is trained to generate the one or more first portrait effects and the one or more second portrait effects. Accordingly, the encoder 461 generates a plurality of feature maps from an input image 901c, as output. Then, the generated feature maps are provided to the one or more first decoders 462, the one or more second decoders 463, and the defocus map decoder 464, as input. The one or more first decoders 462 and the defocus map decoder 464 generate the one or more first portrait effects and the one or more second decoders 463 generate the one or more second portrait effects, using the plurality of feature maps. As can be seen from FIG. 9D, the output images 902d, 904d provided by the defocus map decoder 464 and the one or more first decoders 462 represent the one or more first portrait effects, whereas the output images 906d-908d provided by the one or more second decoders 463 represent the one or more second portrait effects. At operation 905c, one or more third weights associated with each neural network layer of the encoder 461, the one or more first decoders 462, the one or more second decoders 463, and the defocus map decoder 464 are obtained for the next stage, i.e., a third sub-stage of the series of second stages of FIG. 9E. At operation 907c, L1 loss and structural similarity index measure (SSIM) losses are computed by each of the one or more first decoders 462, the one or more second decoders 463, and the defocus map decoder 464 by determining a difference between the generated output images 902d-908d and respective ground truths. For example, L1 loss may be determined by the one or more first decoders 462, such as a Bokeh decoder by determining the difference between the generated output image 904d and respective ground truth for the one or more first portrait effects, such as the Bokeh effect. It should be noted that as known in the art, the SSIM loss may be referred as a perceptual metric to measure similarity of two images, i.e., the output image and the input image and accordingly, the SSIM loss may be calculated using techniques known in the art. It should be noted that the L1 loss and the SSIM losses are used with a reduced learning rate. Further, the encoder 461 may be trained with the help of the L1 loss and the SSIM losses to extract the one or more low level features and the one or more high level features from the input image 901d. L1 loss helps in rough estimation at the initial stages, such as first sub-stage of the series of the second stages and faster convergence in later stages, such as rest of the sub-stages of the series of the second stages. The SSIM loss helps in improving the overall quality of all the portrait effects perceptually (e.g., foreground details—textures, color, boundary quality, and background effects). Some non-uniform effects in the background are observed in the output images 902d-908d, which may be recovered in the next stages of the series of second stages. At operation 909c, it is determined if a loss curve variation is stable after convergence, as discussed in reference to FIG. 8A. If the loss curve variation is determined to be stable, then this stage is ended at operation 911c. If not, then the training is continued by moving back to operation 903c. It should be noted that the one or more third weights associated with each neural network layer of the encoder 461, the one or more first decoders 462, the one or more second decoders 463, and the defocus map decoder 464 are modified after every training iteration until the loss curve variation is determined to be stable at operation 909c and these one or more third weights are carried forward to the third sub-stage of the series of second stages of FIG. 9E. Referring to FIG. 9D, the defocus map decoder 464 is also trained in this stage as the defocus map decoder 464 helps in improving the quality of the one or more first portrait effects. Further, it should be noted that FIG. 9D illustrates an embodiment and accordingly, a Bokeh decoder has been trained as the one or more first decoders 462 and a High Key decoder and a Low Key decoder are trained as the one or more second decoders 463.

Figure 9E:
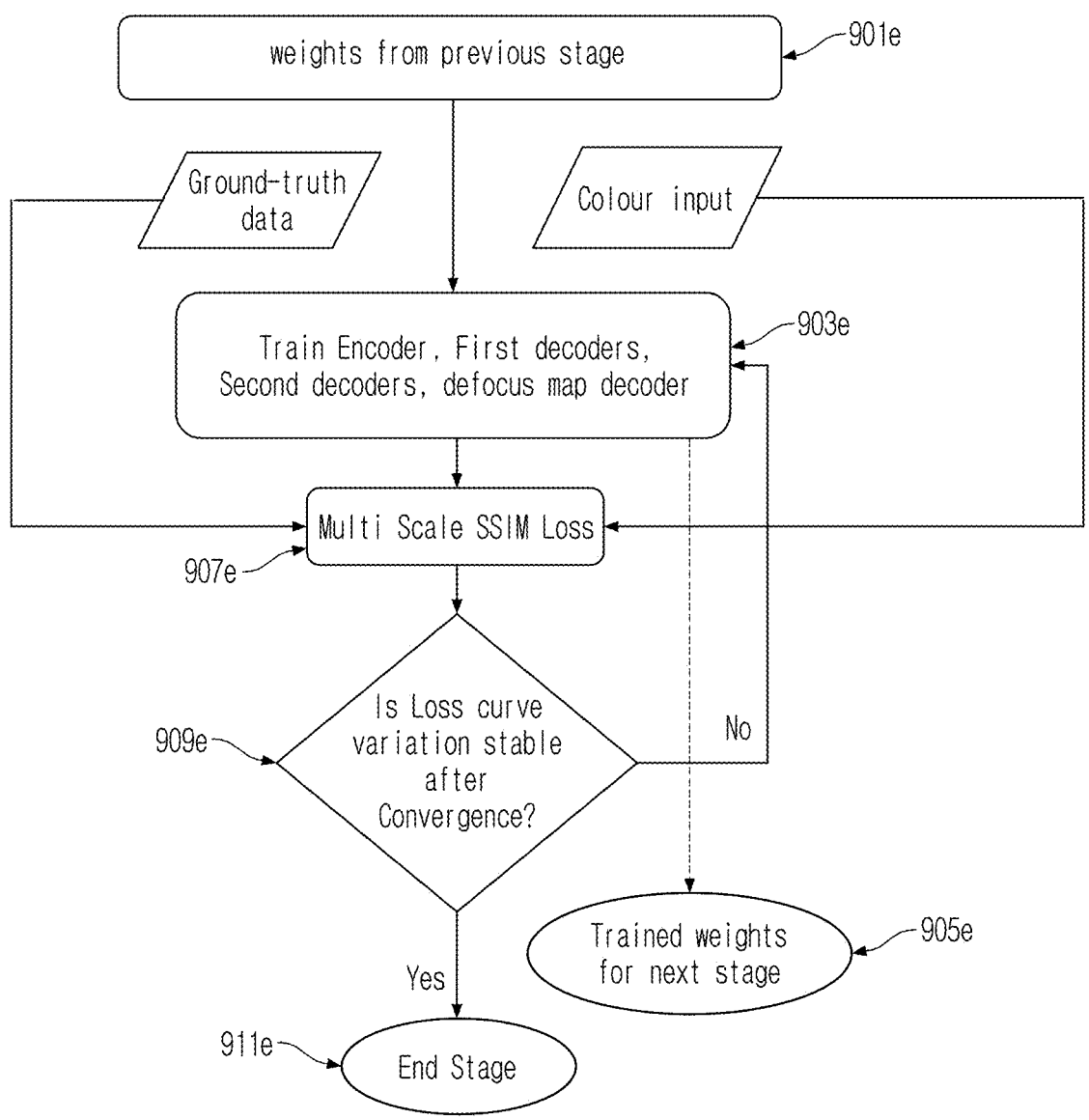

FIG. 9E illustrates a flowchart 900e for a third sub-stage of a series of second stages of training according to an embodiment of the disclosure.

Figure 9F:
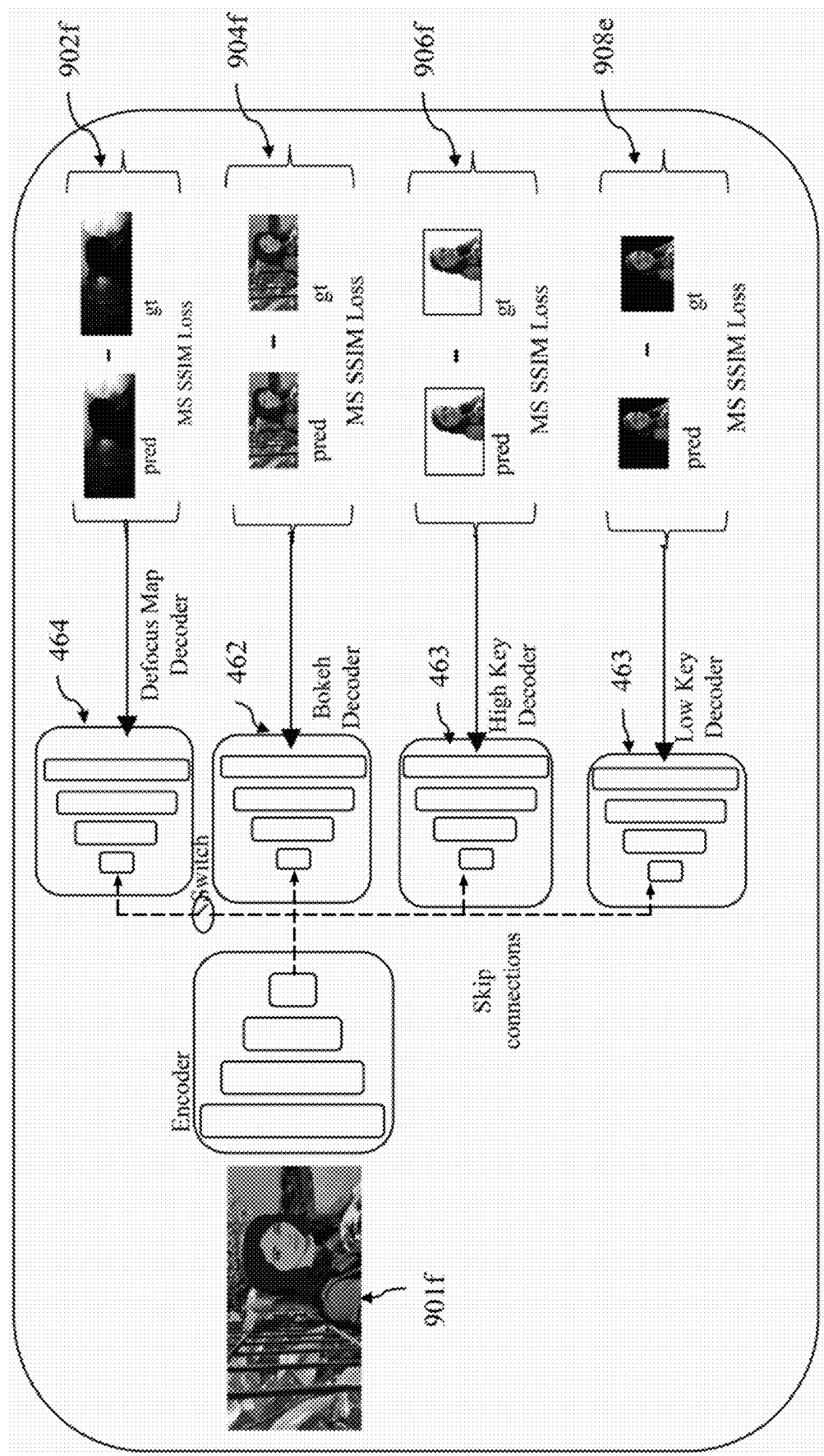

FIG. 9F illustrates a block diagram for a third sub-stage of a series of second stages of training according to an embodiment of the disclosure.

Referring to FIGS. 9E and 9F, they are explained in conjunction with each other. Referring to FIG. 9E, at operation 901e, the one or more third weights associated with each neural network layer of the encoder 461, the one or more first decoders 462, the one or more second decoders 463, and the defocus map decoder 464 from the previous stage, i.e., the second sub-stage of FIG. 9C, are received. At operation 903e, the encoder 461, the one or more first decoders 462, the one or more second decoders 463, and the defocus map decoder 464 are trained to generate the one or more first portrait effects and the one or more second portrait effects. In particular, the encoder 461 is trained to generate the one or more first portrait effects and the one or more second portrait effects. Accordingly, the encoder 461 generates a plurality of feature maps from an input image 901f, as output. Then, the generated feature maps are provided to the one or more first decoders 462, the one or more second decoders 463, and the defocus map decoder 464, as input. The one or more first decoders 462 and the defocus map decoder 464 generate the one or more first portrait effects and the one or more second decoders 463 generate the one or more second portrait effects, using the plurality of feature maps. As can be seen from FIG. 9F, the output images 902f, 904f provided by the defocus map decoder 464 and the one or more first decoders 462 represent the one or more first portrait effects, whereas the output images 906f-908f provided by the one or more second decoders 463 represent the one or more second portrait effects. At operation 905e, one or more fourth weights associated with each neural network layer of the encoder 461, the one or more first decoders 462, the one or more second decoders 463, and the defocus map decoder 464 are obtained for the next stage. i.e., fourth sub-stage of the series of second stages of FIG. 9G. At operation 907e, multi-scale (MS) SSIM losses are computed by each of the one or more first decoders 462, the one or more second decoders 463, and the defocus map decoder 464 by determining by determining a difference between the generated output images 902f-908f and respective ground truths. For example, L1 loss may be determined by the one or more first decoders 462, such as a Bokeh decoder by determining the difference between the generated output image 904f and respective ground truth for the one or more first portrait effects, such as the Bokeh effect. It should be noted that the MS SSIM loss is used with a reduced learning rate. Further, the encoder 461 may be trained with the help of the MS SSIM losses to extract the one or more low level features and the one or more high level features from the input image 901f. As known in the art, The MS SSIM loss is the multiscale SSIM loss computed at different scales (for example 5 Scales are used, such as full resolution, ½, ¼, ⅛, ¹⁄₁₆) between predicted output images and respected ground truths and accordingly, the SSIM loss may be calculated using techniques known in the art. The MS SSIM loss helps in improving the overall quality of all the portrait effects perceptually (e.g., foreground details—textures, color, boundary quality, and background effects). Still, some non-uniform effects in the background in the output images 902f-908f are observed, which may be recovered in the next stage of the series of second stages. At operation 909e, it is determined if a loss curve variation is stable after convergence, as discussed in reference to FIG. 8A. If the loss curve variation is determined to be stable, then this stage is ended at operation 911e. If not, then the training is continued by moving back to operation 903e. It should be noted that the one or more fourth weights associated with each neural network layer of the encoder 461, the one or more first decoders 462, the one or more second decoders 463, and the defocus map decoder 464 are modified after every training iteration until the loss curve variation is determined to be stable at operation 909e and these one or more fourth weights are carried forward to the fourth sub-stage of the series of second stages of FIG. 9G. Further, as shown in FIG. 9F, the defocus map decoder 464 is also trained in this stage as the defocus map decoder 464 helps in improving the quality of the one or more first portrait effects. Further, it should be noted that FIG. 9F illustrates an embodiment. Accordingly, a Bokeh decoder has been trained as the one or more first decoders 462. A High Key decoder and a Low Key decoder are trained as the one or more second decoders 463.

Figure 9G:
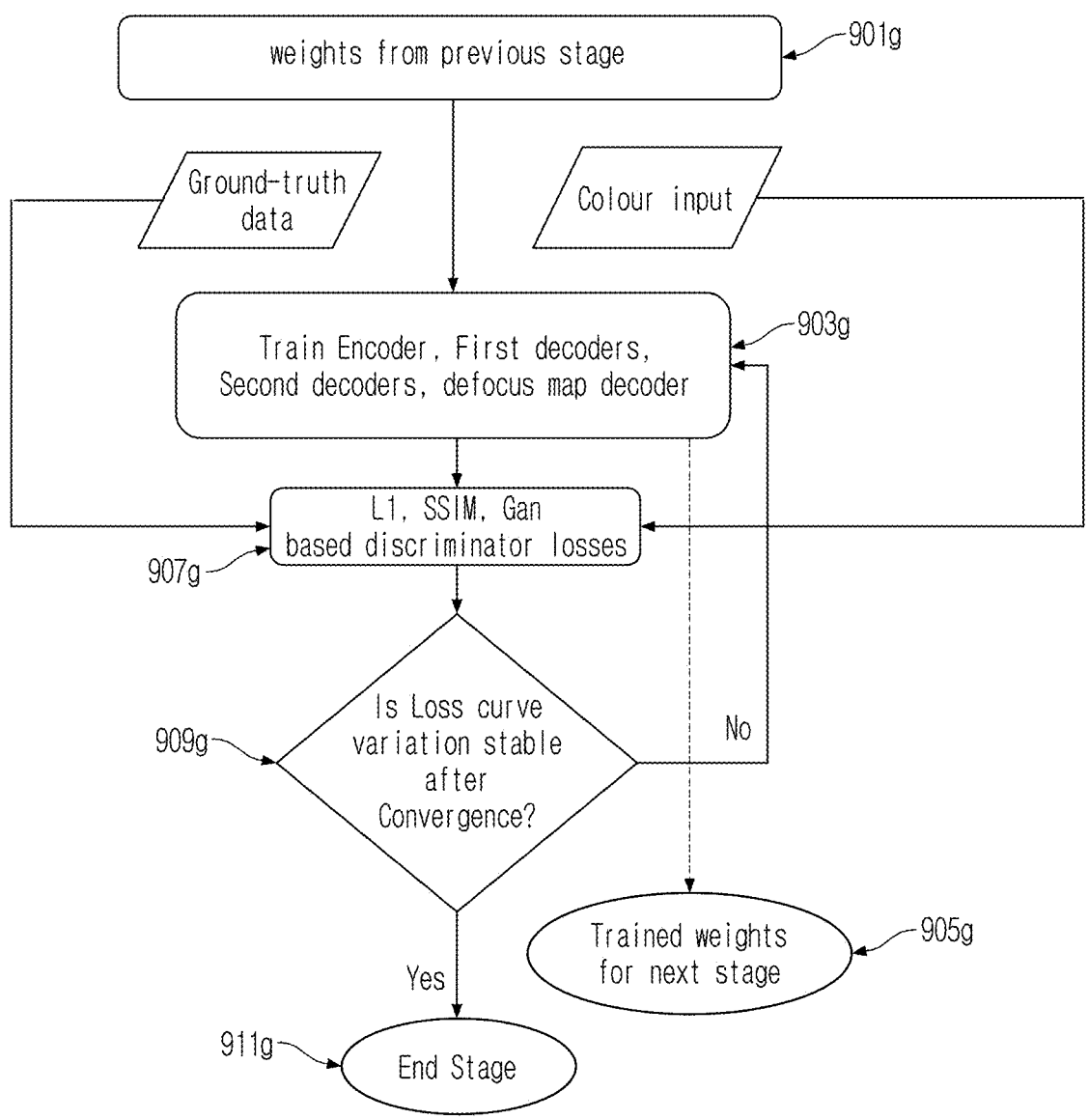

FIG. 9G illustrates a flowchart 900g for a fourth sub-stage of a series of second stages of training according to an embodiment of the disclosure.

FIG. 9H illustrates a block diagram for a fourth sub-stage of a series of second stages of training according to an embodiment of the disclosure.

Referring to FIGS. 9G and 9H, they are explained in conjunction with each other. As shown in FIG. 9G, at operation 901g, the one or more fourth weights associated with each neural network layer of the encoder 461, the one or more first decoders 462, the one or more second decoders 463, and the defocus map decoder 464 from the previous stage, i.e., the third sub-stage of FIG. 9E, are received. At operation 903g, the encoder 461, the one or more first decoders 462, the one or more second decoders 463, and the defocus map decoder 464 are trained to generate the one or more first portrait effects and the one or more second portrait effects. In particular, the encoder 461 is trained to generate the one or more first portrait effects and the one or more second portrait effects. Accordingly, the encoder 461 generates a plurality of feature maps from an input image 901h, as output. Then, the generated feature maps are provided to the one or more first decoders 462, the one or more second decoders 463, and the defocus map decoder 464, as input. The one or more first decoders 462 and the defocus map decoder 464 generate the one or more first portrait effects and the one or more second decoders 463 generate the one or more second portrait effects, using the plurality of feature maps. As can be seen from FIG. 9H, the output images 902h, 904h provided by the defocus map decoder 464 and the one or more first decoders 462 represent the one or more first portrait effects, whereas the output images 906h-908h provided by the one or more second decoders 463 represent the one or more second portrait effects. Then at operation 905g, one or more fifth weights associated with each neural network layer of the encoder 461, the one or more first decoders 462, the one or more second decoders 463, and the defocus map decoder 464 are obtained for the next stage of the training of FIG. 10A. Then at operation 907g, the L1 loss, the SSIM loss, and generative adversarial networks (GAN)-based discriminator losses are computed by each of the one or more first decoders 462, the one or more second decoders 463, and the defocus map decoder 464 by determining a difference between the generated output images 902h-908h and respective ground truths. For example, L1 loss may be determined by the one or more first decoders 462, such as a Bokeh decoder by determining the difference between the generated output image 904h and respective ground truth for the one or more first portrait effects, such as the Bokeh effect. It should be noted that the L1 loss, SSIM loss, and the GAN-based discriminator losses are used with the previous stage learning rate. Further, the encoder 461 may be trained with the help of the L1 loss, the SSIM loss, and the GAN-based discriminator losses to extract the one or more low level features and the one or more high level features from the input image 901h. GANs discriminators are well known for the ability to preserve texture details in an image and generate a more realistic image. In an embodiment of the disclosure, multi-receptive-field discriminators are used. More particularly, one discriminator is used for global feature learning, and one discriminator is used for local feature learning. This step using GAN discriminators helps in retaining the foreground subject quality in all portrait effects. At operation 909g, it is determined if a loss curve variation is stable after convergence, as discussed in reference to FIG. 8A. If the loss curve variation is determined to be stable, then this stage is ended at operation 911g. If not, then the training is continued by moving back to operation 903g. It should be noted that the one or more fifth weights associated with each neural network layer of the encoder 461, the one or more first decoders 462, the one or more second decoders 463, and the defocus map decoder 464 are modified after every training iteration until the loss curve variation is determined to be stable at operation 909g and these one or more fifth weights are carried forward to the next stage of training of FIG. 10A. Further, as shown in FIG. 9H, the defocus map decoder 464 is also trained in this stage as the defocus map decoder 464 helps in improving the quality of the one or more first portrait effects. Further, it should be noted that FIG. 9H illustrates an embodiment. Accordingly, a Bokeh decoder has been trained as the one or more first decoders 462. A High Key decoder and a Low Key decoder are trained as the one or more second decoders 463.

Figure 10A:
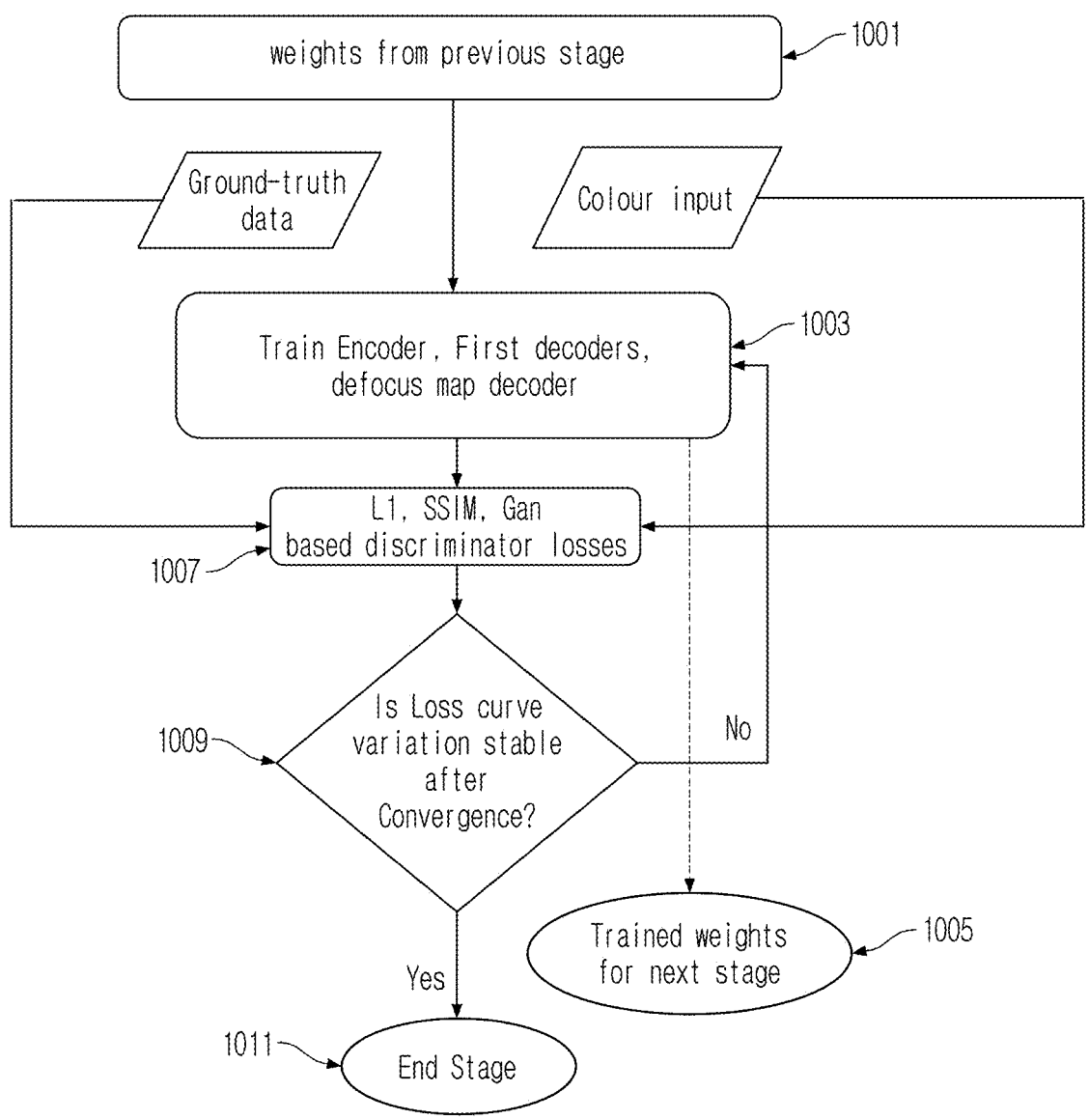
FIG. 10A illustrates a flowchart of training the encoder, the one or more first decoders, and the defocus map decoder according to an embodiment of the disclosure.
Figure 10B:
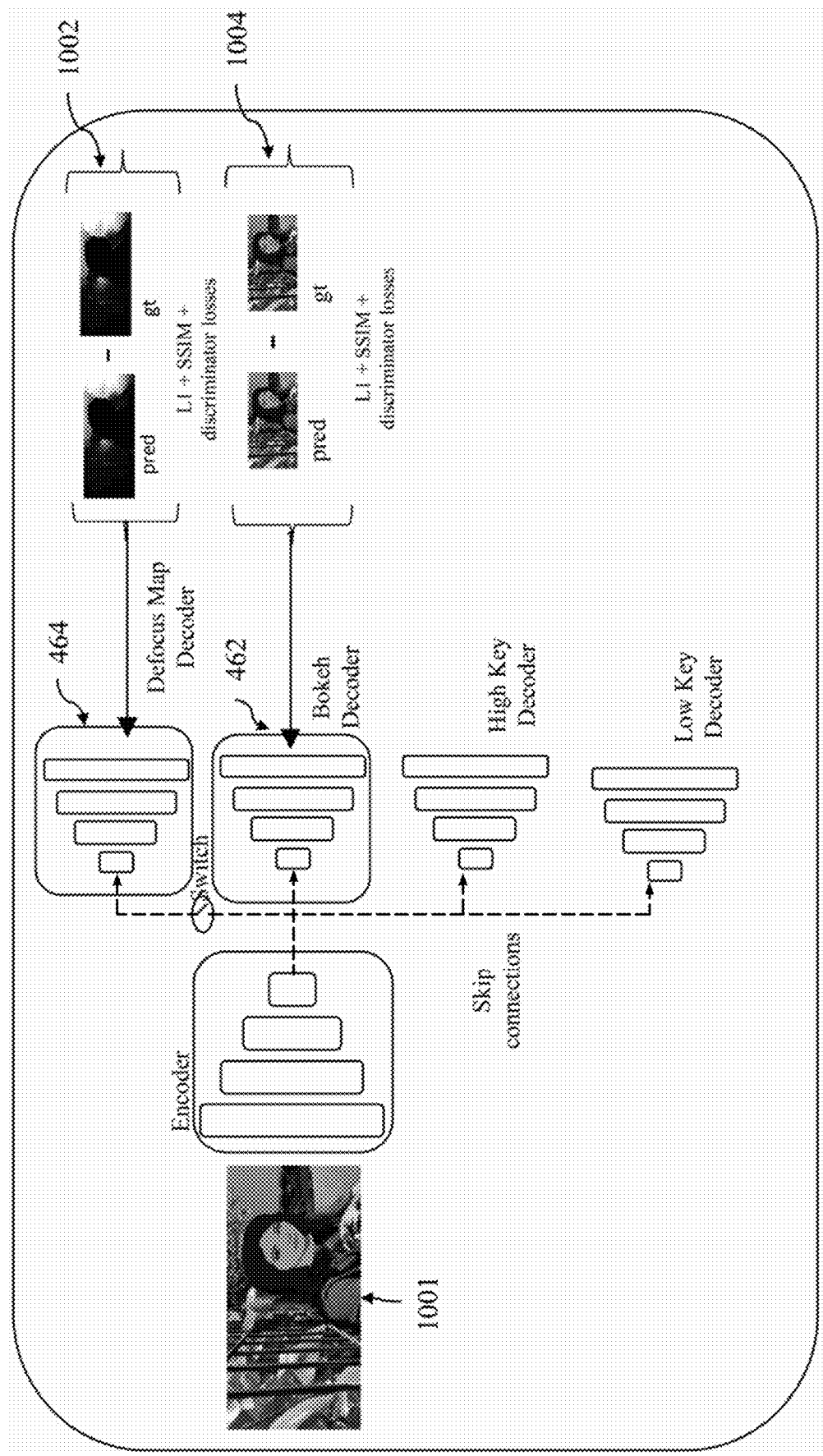
FIG. 10B illustrates a block diagram of training the encoder, the one or more first decoders, and the defocus map decoder according to an embodiment of the disclosure.

After training the encoder 461, the one or more first decoders 462, the one or more second decoders 463, and the defocus map decoder 464 in the series of second stages, the encoder 461, the one or more first decoders 462, and the defocus map decoder 464 are trained to generate the one or more first portrait effects, as shown in FIGS. 10A and 10B. In an embodiment of the disclosure, the encoder 461, the one or more first decoders 462, and the defocus map decoder 464 are trained using the ground truth data for the one or more first portrait effects and the input image, as discussed below in reference to FIGS. 10A and 10B.

FIG. 10A illustrates a flowchart 1000 for training an encoder, one or more first decoders, and a defocus map decoder according to an embodiment of the disclosure. FIG. 10B illustrates a block diagram of training an encoder, one or more first decoders, and a defocus map decoder according to an embodiment of the disclosure.

Referring to FIGS. 10A and 10B, they are explained in conjunction with each other. Referring to FIG. 10A, at operation 1001, the one or more fifth weights associated with each neural network layer of the encoder 461, the one or more first decoders 462, the one or more second decoders 463, and the defocus map decoder 464 from the previous stage, i.e., the fourth sub-stage of FIG. 9G are received. At operation 1003, the encoder 461, the one or more first decoders 462, and the defocus map decoder 464 are trained to generate the one or more first portrait effects. In particular, the encoder 461 is trained to generate the one or more first portrait effects. Accordingly, the encoder 461 generates a plurality of feature maps from an input image 1001, as output. Then, the generated feature maps are provided to the one or more first decoders 462 and the defocus map decoder 464, as input. The one or more first decoders 462 and the defocus map decoder 464 generate the one or more first portrait effects using the plurality of feature maps. Referring to FIG. 10B, the output image 1002 provided by the defocus map decoder 464 and output image 1004 provided by the one or more first decoders 462 represent the one or more first portrait effects. Then at operation 1005, one or more sixth weights associated with each neural network layer of the encoder 461, the one or more first decoders 462, and the defocus map decoder 464 are obtained to be used during inference. Then at operation 1007, the L1 loss, the SSIM loss, and the GAN-based discriminator losses are computed by each of the one or more first decoders 462, and the defocus map decoder 464 by determining a difference between the generated output images 1002-1004 and respective ground truths. For example, L1 loss may be determined by the one or more first decoders 461, such as a Bokeh decoder by determining the difference between the generated output image 1004 and respective ground truth for the one or more first portrait effects, such as the Bokeh effect. Further, the encoder 461 may be trained with the help of the L1 loss, the SSIM loss, and the GAN-based discriminator losses to extract the one or more low level features and the one or more high level features from the input image 1001. This step using helps in achieving the best quality in all portrait effects. At operation 1009, it is determined if a loss curve variation is stable after convergence, as discussed in reference to FIG. 8A. If the loss curve variation is determined to be stable, then this stage is ended at operation 1011. If not, then the training is continued by moving back to operation 1003. It should be noted that the one or more sixth weights associated with each neural network layer of the encoder 461, the one or more first decoders 462, and the defocus map decoder 464 are modified after every training iteration until the loss curve variation is determined to be stable at operation 1009 and these one or more sixth weights are used during inference. Further, as shown in FIG. 10B), the defocus map decoder 464 is also trained in this stage as the defocus map decoder 464 helps in improving the quality of the one or more first portrait effects. Further, it should be noted that FIG. 10B illustrates an embodiment and accordingly, a Bokeh decoder has been trained as the one or more first decoders 462.

Further, it should be noted that the defocus map decoder 464 is only used in the training to improve the quality of the one or more first portrait effects. The defocus map decoder 464 is not used when generating the one or more first portrait effects, i.e., during inference as the encoder 261 has already learnt features important to the one or more first portrait effects, such as blur depth gradient feature which is important to improve the quality of the Bokeh effect. As can be seen from FIGS. 9B, 9D, 9F, 9H, and 10B, there are no interconnections between the decoders 462, 463 and 464. Skip connections are only between the encoder 461 and the decoders 462, 463. Due to this, the defocus map decoder 464 is disconnected during inference and is used only during training.

Further, the switch shown in FIGS. 9B, 9D, 9F, 9H, and 10B is used to connect the desirable decoder for training the plurality of stages.

Figure 11:
FIG. 11 illustrates a comparison between portrait effects generated with the disclosed technique and portrait effects generated using a DSLR according to an embodiment of the disclosure.

FIG. 11 illustrates a comparison between portrait effects generated with a disclosed technique and portrait effects generated using a DSLR according to an embodiment of the disclosure.

Referring to FIG. 11, the portrait effect 1102, i.e., a High Key effect generated using the disclosed technique is very close to the High Key effect 1104 generated using the DSLR. Hence, the disclosed techniques improve the quality of the generated portrait effects.

Accordingly, it can be seen that the disclosure generates the plurality of portrait effects using a single DNN model in a single inference. Since all the portrait effects use the same color image as an input, the disclosed techniques learn common image attributes, such as low level features and high level features.

Accordingly, the disclosed techniques may reduce memory utilization and processing time, thereby improving the performance of the electronic device. Further, the disclosed techniques may allow switching across the plurality of effects, such as the Bokeh effect, the High Key effect, and the Low Key effect with no delay due to the generation of all the portrait effects in a single inference. Also, the disclosed techniques may enable a user to create portrait effects on any image in a gallery or any video with a single click.

The various actions, acts, blocks, steps, or the like in the flow diagrams may be performed in the order presented, in a different order, or simultaneously. Further, in some embodiments of the disclosure, some of the actions, acts, blocks, steps, or the like may be omitted, added, modified, skipped, or the like without departing from the scope of the disclosure.

Unless otherwise defined, all technical and scientific terms used herein have the same meaning as commonly understood by one ordinary skilled in the art to which this disclosure belongs. The system, methods, and examples provided herein are illustrative only and not intended to be limiting.

While specific language has been used to describe the subject matter, any limitations arising on account thereto, are not intended. As would be apparent to a person in the art, various working modifications may be made to the method to implement the inventive concept as taught herein. The drawings and the forgoing description give examples of embodiments. Those skilled in the art will appreciate that one or more of the described elements may well be combined into a single functional element. Alternatively, certain elements may be split into multiple functional elements. Elements from an embodiment may be added to another embodiment.

The embodiments disclosed herein can be implemented using at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for generation of a plurality of portrait effects in an electronic device, the method comprising:
   feeding an image captured from the electronic device into an encoder pre-learned using a plurality of features corresponding to the plurality of portrait effects;
   extracting, using the encoder, at least one of one or more low level features and one or more high level features from the image;
   generating, for the image, one or more first portrait effects of the plurality of portrait effects based on the at least one of the one or more high level features and the one or more low level features by passing the image through one or more first decoders; and
   generating, for the image, one or more second portrait effects of the plurality of portrait effects based on the at least one of the one or more high level features and the one or more low level features by passing the image through one or more second decoders, wherein each of the one or more first portrait effect, and the one or more second portrait effects is generated in a single inference.

2. The method of claim 1,
wherein the one or more first decoders comprises a Bokeh decoder, the one or more second decoders comprises a High Key decoder, and a Low Key decoder, and
wherein the one or more first portrait effects is at least one of a Big circle effect, a studio effect or a Bokeh effect associated with the Bokeh decoder, the one or more second portrait effects is at least one of a High Key portrait effect, a Low Key portrait effect, a color backdrop effect, a color point effect, a spin effect, or a zoom effect.

3. The method of claim 1,
wherein the one or more first portrait effects relates to depth-related camera features, and
wherein the one or more second portrait effects relates to segmentation-related camera features.

4. The method of claim 1, wherein the encoder, the one or more first decoders, and the one or more second decoders are comprised within a single deep neural network (DNN) model.

5. The method of claim 4, further comprising:
training the single DNN model, wherein training the single DNN model comprises:
generating ground truth data for each of the one or more first portrait effects, and the one or more second portrait effects using a plurality of data modules,
training the encoder in a plurality of stages using the generated ground truth to extract the at least one of the one or more low level features and the one or more high level features from the image, and
training the encoder, the one or more first decoders, the one or more second decoders, and a defocus map decoder associated with the one or more first decoders in a plurality of stages using the generated ground truth data to generate the one or more first and the one or more second portrait effect.

6. The method of claim 5, wherein the generating of the ground truth data for the one or more first portrait effects comprises:
generating the ground truth data using a shallow depth of field of an input color image captured using a first aperture of a lens of a camera and a wide depth of field of the input color image captured using a second aperture of the lens of the camera; and
generating a ground truth defocus map by generating a depth map of the input color image and generating a defocus map based on the depth map to generate the ground truth data for the one or more first portrait effects.

7. The method of claim 5, wherein the generating of the ground truth data for the one or more second portrait effects comprises:
generating a segmentation mask of an input color image;
generating a high-resolution matting mask from the segmentation mask;
refining the generated matting mask; and
generating the one or more second portrait effects on the input color image by changing one or more color parameters of the input color image and replacing a background of the input color image with a predetermined background based on the one or more second portrait effects.

8. The method of claim 5, wherein the training of the encoder, the one or more first decoders, the one or more second decoders, and the defocus map decoder comprises:
training the encoder, the one or more first decoders, and the one or more second decoders in a first stage of the plurality of stages to provide an input image as an output image;
training the encoder, the one or more first decoders, the one or more second decoders, and the defocus map decoder in a series of second stages of the plurality of stages to generate the one or more first portrait effect, and the one or more second portrait effects using the ground truth data for each of the one or more first portrait effects, and the one or more second portrait effects and the input image; and
training the encoder, the one or more first decoders and the defocus map decoder to generate the one or more first portrait effects using the ground truth data for the one or more first portrait effects and the input image.

9. A system for generation of a plurality of portrait effects in an electronic device, the system comprising:
an encoder configured to:
receive an image captured from the electronic device, wherein the encoder is pre-learned using a plurality of features corresponding to the plurality of portrait effects, and
extract at least one of one or more low level features and one or more high level features from the image;
one or more first decoders to generate, for the image, one or more first portrait effects of the plurality of portrait effects based on the at least one of the one or more high level features and the one or more low level features; and
one or more second decoders to generate, for the image, one or more second portrait effects of the plurality of portrait effects based on the at least one of the one or more high level features and the one or more low level features, wherein each of the one or more first, and the one or more second portrait effects is generated in a single inference.

10. The system of claim 9,
wherein the one or more first decoders comprises a Bokeh decoder, and the one or more second decoders comprise a High Key decoder, and a Low Key decoder, and
wherein the one or more first portrait effects is a Bokeh effect associated with the Bokeh decoder, the one or more second portrait effects is at least one of a High Key portrait effect, a Low Key portrait effect, a color backdrop effect, a color point effect, a spin effect, or a zoom effect.

11. The system of claim 9, wherein the encoder, the one or more first decoders, and the one or more second decoders are comprised within a single DNN model.

12. The system of claim 11, wherein the single DNN model is trained by:
generating ground truth data for each of the one or more first portrait effects, and the one or more second portrait effects using a plurality of data modules;
training the encoder in a plurality of stages using the generated ground truth to extract the at least one of the one or more low level features and the one or more high level features from the image; and
training the encoder, the one or more first decoders, the one or more second decoders, and a defocus map decoder associated with the one or more first decoders in a plurality of stages using the generated ground truth data to generate the one or more first and the one or more second portrait effect.

13. The system of claim 12, wherein the ground truth data for the one or more first portrait effects is generated by:
   generating the ground truth data using a shallow depth of field of an input color image captured using a first aperture of a lens of a camera and a wide depth of field of the input color image captured using a second aperture of the lens of the camera; and
   generating a ground truth defocus map by generating a depth map of the input color image and generating a defocus map based on the depth map to generate the ground truth data for the one or more first portrait effects.

14. The system of claim 12, wherein the ground truth data for the one or more second portrait effects is generated by:
   generating a segmentation mask of an input color image;
   generating a high-resolution matting mask from the segmentation mask;
   refining the generated matting mask; and
   generating the one or more second portrait effects on the input color image by changing one or more color parameters of the input color image and replacing a background of the input color image with a predetermined background based on the one or more second portrait effects.

15. The system of claim 12, wherein the encoder, the one or more first decoders, the one or more second decoders, and the defocus map decoder are trained by:
   training the encoder, the one or more first decoders, and the one or more second decoders, in a first stage of the plurality of stages to provide an input image as an output image;
   training the encoder, the one or more first decoders, and the one or more second decoders, and the defocus map decoder in a series of second stages of the plurality of stages to generate the one or more first portrait effect, and the one or more second portrait effect, using the ground truth data for each of the one or more first portrait effects, and the one or more second portrait effects and the input image; and
   training the encoder, the one or more first decoders and the defocus map decoder to generate the one or more first portrait effects using the ground truth data for the one or more first portrait effects and the input image.

16. The system of claim 9,
   wherein the one or more first portrait effects relates to depth-related camera features, and
   wherein the one or more second portrait effects relates to segmentation-related camera features.

17. The system of claim 9, further comprising:
   a memory;
   a processor;
   a communicator;
   a display;
   one or more cameras; and
   an image processor,
   wherein the memory stores the plurality of portrait effects and information related to the generation of the plurality of portrait effects, and
   wherein the memory stores instructions to be executed by the processor for generating the plurality of portrait effects.

* * * * *